(12) United States Patent
Fan et al.

(10) Patent No.: US 12,455,361 B2
(45) Date of Patent: Oct. 28, 2025

(54) APPARATUS AND METHOD FOR MEASURING AN EMBEDDED OBJECT

(71) Applicant: Nanyang Technological University, Singapore (SG)

(72) Inventors: Zheng Fan, Singapore (SG); Haihan Sun, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 209 days.

(21) Appl. No.: 18/137,770

(22) Filed: Apr. 21, 2023

(65) Prior Publication Data

US 2023/0341536 A1    Oct. 26, 2023

(30) Foreign Application Priority Data

Apr. 22, 2022   (SG) .......................... 10202204223Q

(51) Int. Cl.
| | |
|---|---|
| *G01S 13/42* | (2006.01) |
| *G01S 7/298* | (2006.01) |
| *G01S 13/88* | (2006.01) |
| *H01Q 1/12* | (2006.01) |

(52) U.S. Cl.
CPC .............. *G01S 13/42* (2013.01); *G01S 7/298* (2013.01); *G01S 13/887* (2013.01); *H01Q 1/125* (2013.01)

(58) Field of Classification Search
CPC ........ G01S 13/42; G01S 7/298; G01S 13/887; H01Q 1/125
See application file for complete search history.

(56) References Cited

U.S. PATENT DOCUMENTS

| | | | | |
|---|---|---|---|---|
| 6,496,136 B1 * | 12/2002 | Mucciardi | ............... | G01S 13/89 342/191 |
| 2018/0156889 A1 * | 6/2018 | Charvat | ................... | H01Q 9/26 |

FOREIGN PATENT DOCUMENTS

| | | | | |
|---|---|---|---|---|
| CN | 111751392 A | * | 10/2020 | ............. G01N 23/20 |
| RU | 2564454 C1 | * | 10/2015 | |

OTHER PUBLICATIONS

H.-H. Sun, W. Cheng and Z. Fan, "Dual-Polarized Ground-Penetrating Radar Method for Sizing Cylindrical Metal Bars," 2023 12th International Workshop on Advanced Ground Penetrating Radar (IWAGPR), Lisbon, Portugal, 2023, pp. 1-4 (Year: 2023).*

(Continued)

*Primary Examiner* — Robert W Hodge
*Assistant Examiner* — Bongani Jabulani Mashele
(74) *Attorney, Agent, or Firm* — Thomas Horstemeyer, LLP

(57) ABSTRACT

The present disclosure generally relates to an apparatus (100) and method for measuring an object (200) embedded in a structure (210). The apparatus (100) comprises: a first antenna (110*a*) and a second antenna (110*b*) with respective perpendicular and parallel polarizations; a measurement instrument (120); and a control system (130). The measurement instrument (120) transmits and measures radio signals reflected from the object (200). The control system (130) generates a first representation (250) and a second representation (260) of the object (200) based on the measured radio signals from the first antenna (110*a*) and second antenna (110*b*), respectively. The control system (130) then measures a size of the object (200) from the first and second representations (250,260).

15 Claims, 16 Drawing Sheets

(56) References Cited

OTHER PUBLICATIONS

Shihab, S. and Al-Nuaimy, W., 'Radius Estimation for Cylindrical Objects Detected by Ground Penetrating Radar' in: Subsurface Sensing Technologies and Applications, vol. 6, No. 2, Apr. 2005, pp. 151-166.

Dolgiy, Ana., Dolgiy, and., and Zolotarev, V., "Optimal Radius Estimation for Subsurface Pipes Detected by Ground Penetrating Radar" Proceedings of the Eleventh International Conference on Ground Penetrating Radar, Jun. 19-22, 2006, Columbus Ohio, USA.

Liu, T., Klotzesche, A., Pondkule, M., Vereecken, H., van der Kruk, J., and Su, Y., "Estimation of subsurface cylindrical object properties from GPR full-waveform inversion," 2017 9th International Workshop on Advanced Ground Penetrating Radar (IWAGPR), Edinburgh, UK, 2017, pp. 1-4, doi: 10.1109/IWAGPR.2017.7996064.

Giannakis, I., Giannopoulos, A., and Warren, C., "A Machine Learning-Based Fast-Forward Solver for Ground Penetrating Radar With Application to Full-Waveform Inversion," in IEEE Transactions on Geoscience and Remote Sensing, vol. 57, No. 7, pp. 4417-4426, Jul. 2019, doi: 10.1109/TGRS.2019.2891206.

\* cited by examiner

APPARATUS AND METHOD FOR MEASURING AN EMBEDDED OBJECT

CROSS REFERENCE TO RELATED APPLICATIONS

The present disclosure claims the benefit of Singapore Patent Application 10202204223Q filed on 22 Apr. 2022, which is incorporated in its entirety by reference herein.

TECHNICAL FIELD

The present disclosure generally relates to an apparatus and method for measuring an embedded object. More particularly, the present disclosure describes various embodiments of an apparatus and a method for measuring an object embedded in a structure, such as a rebar embedded in a concrete structure.

BACKGROUND

Reinforced concrete is an economical and multipurpose construction material and is one of the most widely used materials in modern construction. Corrosion damage in reinforcing steel bars (or rebars) has been a major cause of cracking and spalling of reinforced concrete. For example, reduction in the cross-sectional size of rebars induced by corrosion impacts the durability and sustainability of reinforced concrete structures. Accurate measurement of the rebar size is necessary to assess the corrosion status of the rebar as well as for structural health examination and safety evaluation of the reinforced concrete structures, so that timely structural maintenance and repairs can be conducted.

Non-destructive measurement methods are used to examine the embedded rebar without destroying the reinforced concrete. Ground-penetrating radar (GPR) is a common non-destructive method that is commercially available to inspect concrete structures and to locate and characterize rebars in concrete structures. However, there are significant challenges to accurately measure the size of the rebar using existing GPR methods, especially for rebars with small diameters.

Therefore, in order to address or alleviate at least one of the aforementioned problems and/or disadvantages, there is a need to provide an improved apparatus and method for measuring a rebar embedded in concrete.

SUMMARY

According to a first aspect of the present disclosure, there is an apparatus for measuring an object embedded in a structure. The apparatus comprises:
  a first antenna for use with the structure such that a polarization of the first antenna is perpendicular to an orientation axis of the embedded object;
  a second antenna coupled perpendicularly to the first antenna, the second antenna for use with the structure such that a polarization of the second antenna is parallel to the orientation axis of the embedded object; a measurement instrument configured for:
    transmitting radio signals from the antennas into the structure as the antennas move across the structure and pass over the embedded object; and
    measuring, from each antenna, the radio signals transmitted from the antennas and reflected from the embedded object; and
  a control system configured for:
    controlling the measurement instrument to configure the antennas to transmit and receive the radio signals for said measurement;
    generating a first representation of the embedded object based on the measured radio signals from the first antenna;
    generating a second representation of the embedded object based on the measured radio signals from the second antenna; and
    measuring a size of the embedded object from the first and second representations.

According to a second aspect of the present disclosure, there is a method for measuring an object embedded in a structure. The method comprises:
  arranging a first antenna such that a polarization of the first antenna is perpendicular to an orientation axis of the embedded object;
  arranging a second antenna on the structure such that a polarization of the second antenna is parallel to the orientation axis of the embedded object, the second antenna being coupled perpendicularly to the first antenna;
  configuring the antennas to transmit and receive radio signals for measurement;
  moving the antennas across the structure;
  transmitting radio signals from the antennas into the structure as the antennas move across the structure and pass over the embedded object;
  measuring, from each antenna, the radio signals transmitted from the antennas and reflected from the embedded object;
  generating a first representation of the embedded object based on the measured radio signals from the first antenna;
  generating a second representation of the embedded object based on the measured radio signals from the second antenna; and
  measuring a size of the embedded object from the first and second representations.

According to a third aspect of the present disclosure, there is a method for measuring an object embedded in a structure. The method comprises:
  configuring an antenna to transmit and receive radio signals for measurement;
  arranging the antenna in a first orientation such that a polarization of the antenna is one of perpendicular and parallel to an orientation axis of the embedded object;
  moving the antenna in the first orientation across the structure;
  transmitting radio signals from the antenna in the first orientation into the structure as the antenna moves across the structure and passes over the embedded object;
  measuring, from the antenna in the first orientation, the radio signals transmitted from the antenna and reflected from the embedded object;
  generating a first representation of the embedded object based on the measured radio signals from the antenna in the first orientation;
  arranging the antenna in a second orientation such that the polarization of the antenna is the other of perpendicular and parallel to the orientation axis of the embedded object;
  moving the antenna in the second orientation across the structure;

transmitting radio signals from the antenna in the second orientation into the structure as the antenna moves across the structure and passes over the embedded object;

measuring, from the antenna in the second orientation, the radio signals transmitted from the antenna and reflected from the embedded object;

generating a second representation of the embedded object based on the measured radio signals from the antenna in the second orientation; and measuring a size of the embedded object from the first and second representations.

An apparatus and method for measuring an embedded object according to the present disclosure are thus disclosed herein. Various features and advantages of the present disclosure will become more apparent from the following detailed description of the embodiments of the present disclosure, by way of non-limiting examples only, along with the accompanying drawings.

DETAILED DESCRIPTION

Figure 1A:
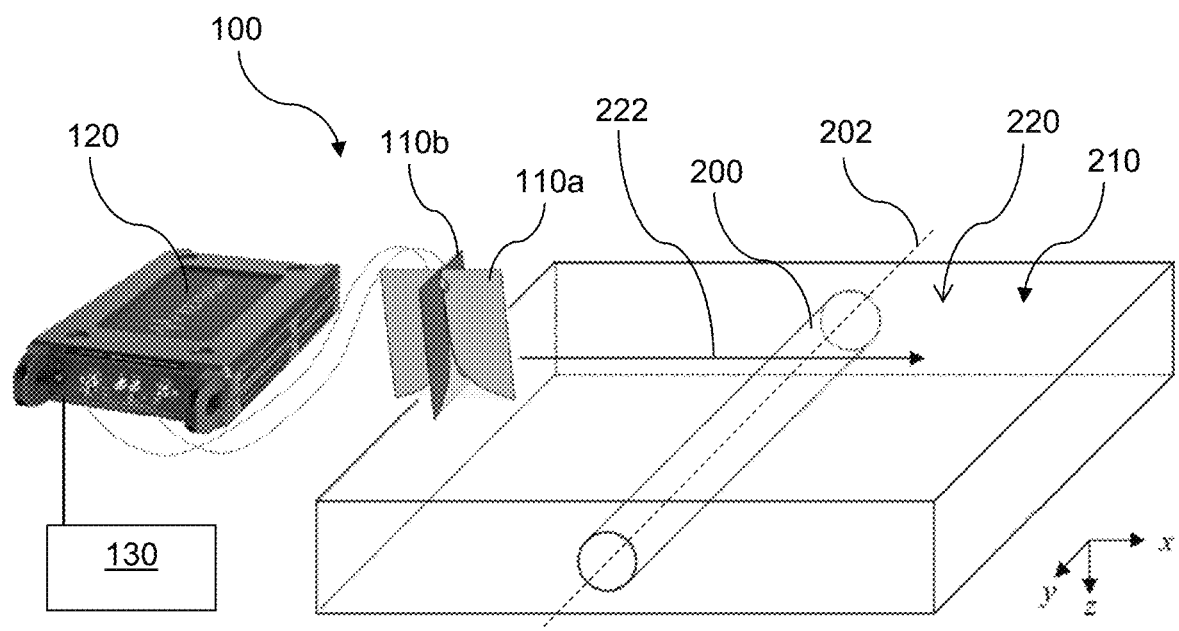
FIGS. 1A and 1B are illustrations of an apparatus for measuring an embedded object.

For purposes of brevity and clarity, descriptions of embodiments of the present disclosure are directed to an apparatus and method for measuring an embedded object, in accordance with the drawings. While parts of the present disclosure will be described in conjunction with the embodiments provided herein, it will be understood that they are not intended to limit the present disclosure to these embodiments. On the contrary, the present disclosure is intended to cover alternatives, modifications and equivalents to the embodiments described herein, which are included within the scope of the present disclosure as defined by the appended claims. Furthermore, in the following detailed description, specific details are set forth in order to provide a thorough understanding of the present disclosure. However, it will be recognized by an individual having ordinary skill in the art, i.e. a skilled person, that the present disclosure may be practiced without specific details, and/or with multiple details arising from combinations of features of particular embodiments. In a number of instances, well-known systems, methods, procedures, and components have not been described in detail so as to not unnecessarily obscure features of the embodiments of the present disclosure.

In embodiments of the present disclosure, depiction of a given element or consideration or use of a particular element number in a particular figure or a reference thereto in corresponding descriptive material can encompass the same, an equivalent, or an analogous element or element number identified in another figure or descriptive material associated therewith.

References to "an embodiment/example", "another embodiment/example", "some embodiments/examples", "some other embodiments/examples", and so on, indicate that the embodiment(s)/example(s) so described may include a particular feature, structure, characteristic, property, element, or limitation, but that not every embodiment/example necessarily includes that particular feature, structure, characteristic, property, element or limitation. Furthermore, repeated use of the phrase "in an embodiment/example" or "in another embodiment/example" does not necessarily refer to the same embodiment/example.

The terms "comprising", "including", "having", and the like do not exclude the presence of other features/elements/steps than those listed in an embodiment. Recitation of certain features/elements/steps in mutually different embodiments does not indicate that a combination of these features/elements/steps cannot be used in an embodiment.

As used herein, the terms "a" and "an" are defined as one or more than one. The use of "/" in a figure or associated text is understood to mean "and/or" unless otherwise indicated. The term "set" is defined as a non-empty finite organization of elements that mathematically exhibits a cardinality of at least one (e.g. a set as defined herein can correspond to a unit, singlet, or single-element set, or a multiple-element set), in accordance with known mathematical definitions. The recitation of a particular numerical value or value range herein is understood to include or be a recitation of an approximate numerical value or value range. The terms "first", "second", etc. are used merely as labels or identifiers and are not intended to impose numerical requirements on their associated terms.

Representative or exemplary embodiments of the present disclosure describe an apparatus 100 for measuring an object 200 embedded in a structure 210, with reference to FIG. 1A. The apparatus 100 includes a first antenna 110 $a$ for use with the structure 210 such that a polarization of the first antenna 110 $a$ is perpendicular to an orientation axis 202 of the embedded object 200. The apparatus 100 includes a second antenna 110 $b$ for use with the structure 210 such that a polarization of the second antenna 110 $b$ is parallel to the orientation axis 202 of the embedded object 200. The antenna polarization is defined as the direction of the electromagnetic fields produced by the antenna as energy radiates away from it.

Figure 1B:
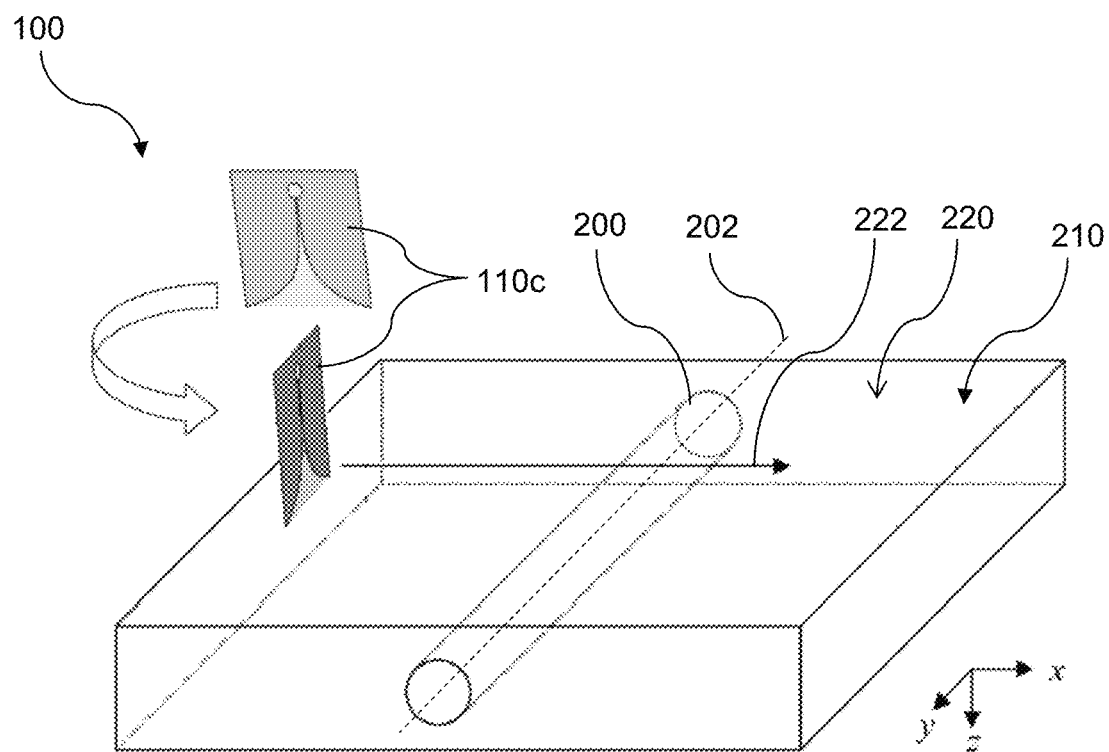

In some embodiments as shown in FIG. 1A, the first antenna 110$a$ and the second antenna 110$b$ are coupled perpendicularly to each other, such that the first antenna 110$a$ and the second antenna 110$b$ can be moved together as a dual-polarized antenna device. In some embodiments as shown in FIG. 1B, the apparatus 100 includes a single antenna 110$c$ that is single polarized. The single antenna 110$c$ can be arranged in a first orientation like the first antenna 110$a$ wherein the antenna polarization is perpendicular to the orientation axis 202. The single antenna 110$c$ can be arranged in a second orientation like the second antenna 110$b$ wherein the antenna polarization is parallel to the orientation axis 202. The term "antennas 110" is used herein to collectively refer to the first antenna 110a and second antenna 110b, as well as the single antenna 110c, in their respective embodiments.

The apparatus 100 further includes a measurement instrument 120 and a control system 130. When the apparatus 100 is in use, the measurement instrument 120 is electrically connected to the antennas 110 and the control system 130 is communicatively connected to the measurement instrument 120. More particularly, the control system 130 is configured for controlling the measurement instrument 120 to configure the antennas 110 to transmit and receive radio signals or waves for measurement. Preferably, the radio signals are radio pulse signals and have a broadband frequency range that preserves penetration depth, high resolution, and sensitivity to embedded objects 200 such as reinforcing bars or rebars. For example, the frequency range is about 0.5 GHz to 3.3 GHz.

The measurement instrument 120 is configured for transmitting radio signals from the antennas 110 into the structure 210 as the antennas 110 move across the structure 210 and pass over the embedded object 200. More specifically, the antennas 110 are arranged on a surface 220 of the structure 210 and move across the surface 220 along a scanning trace 222 that is perpendicular to the orientation axis 202 of the embedded object 200. The distance between the antennas 110 and the surface 220 should satisfy the far field conditions of the antennas 110.

The measurement instrument 120 is further configured for measuring, from each antenna 110, the radio signals transmitted from the antennas 110 and reflected from the embedded object 200. In some embodiments, the measurement instrument 120 is a vector network analyzer which is a test instrument for measuring electrical networks and is configured to generate radio signals for transmission by the antennas 110.

In one example as shown in FIG. 1A, the first antenna 110a and the second antenna 110b are coupled together. The antennas 110 move across the surface 220 along the scanning trace 222 and transmit radio signals into the structure 210. The radio signals are reflected from the embedded object 200 and detected by each of the first antenna 110a and the second antenna 110b.

In one example as shown in FIG. 1B, the single antenna 110c is in the first orientation and moves across the surface 220 along the scanning trace 222 and transmits radio signals into the structure 210. The radio signals are reflected from the embedded object 200 and detected by the single antenna 110c in the first orientation. The single antenna 110c is then rotated to the second orientation and moves across the surface 220 reversely along the scanning trace 222 and transmits radio signals into the structure 210. The radio signals are reflected from the embedded object 200 and detected by the single antenna 110c in the second orientation.

Figure 2A:
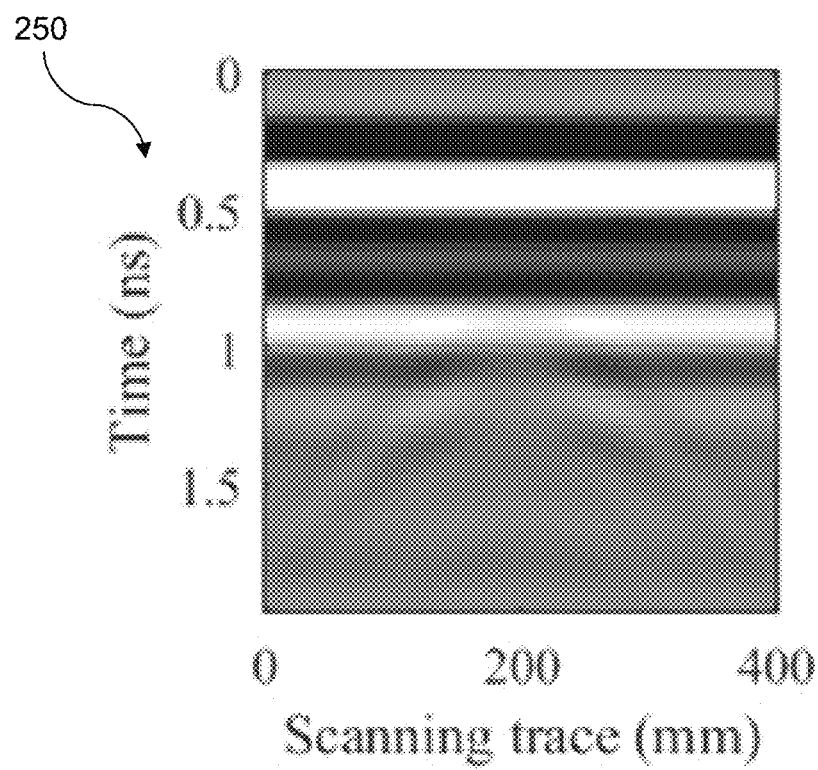
FIGS. 2A and 2B are illustrations of representations of the embedded object.
Figure 2B:
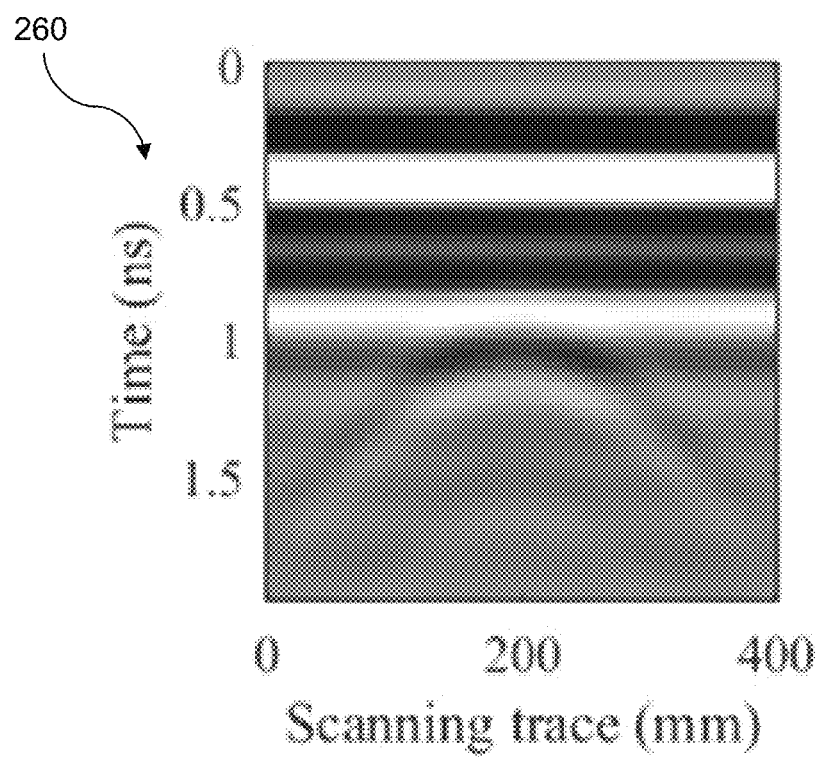

The control system 130 is configured for generating a first representation 250 of the embedded object 200 based on the measured radio signals from the first antenna 110a, or the measured radio signals from the single antenna 110c in the first orientation. The control system 130 is configured for generating a second representation 260 of the embedded object 200 based on the measured radio signals from the second antenna 110b, or the measured radio signals from the single antenna 110c in the second orientation. The representations 250, 260 of the embedded object 200 may be radargram images generated by the radio signals measured from the antennas 110, such as shown in FIGS. 2A and 2B.

The control system 130 is further configured for measuring a size of the embedded object 200 from the first representation 250 and the second representation 260.

In many embodiments, the control system 130 is a computer device and includes one or more processors configured for executing instructions, codes, computer programs, and/or scripts. The processor includes suitable logic, circuitry, and/or interfaces to execute such operations or steps. Some non-limiting examples of the processor include an application-specific integrated circuit (ASIC) processor, a reduced instruction set computing (RISC) processor, a complex instruction set computing (CISC) processor, a field-programmable gate array (FPGA), and the like. While instructions may be executed by a processor, the instructions may be executed simultaneously, serially, or otherwise executed by one or multiple processors (e.g. in a multi-core configuration).

Representative or exemplary embodiments of the present disclosure also describe a method for measuring an object 200 embedded in a structure 210. The method may be performed by the apparatus 100 as shown in FIG. 1A, the apparatus 100 as shown in FIG. 1B, or any other suitable apparatus.

Referring to the apparatus 100 as shown in FIG. 1A, the method includes arranging the first antenna 110a such that the polarization of the first antenna 110a is perpendicular to the orientation axis 202 of the embedded object 200. The method includes arranging the second antenna 110b on the structure 210 such that the polarization of the second antenna 110b is parallel to the orientation axis 202 of the embedded object 200, the second antenna 110b being coupled perpendicularly to the first antenna 110a. The method includes configuring the antennas 110 to transmit and receive radio signals for measurement. The method includes moving the antennas 110 (dual polarized) across the structure 210, i.e. across the surface 220 and along the scanning trace 222. The method includes transmitting radio signals from the antennas 110 into the structure 210 as the antennas 110 move across the structure 210 and pass over the embedded object 200. The method includes measuring, from each antenna 110, the radio signals transmitted from the antennas 110 and reflected from the embedded object 200. The method includes generating the first representation 250 of the embedded object 200 based on the measured radio signals from the first antenna 110a. The method includes generating the second representation 260 of the embedded object 200 based on the measured radio signals from the second antenna 110b. The method includes measuring the size of the embedded object from the first representation 250 and the second representation 260.

Referring to the apparatus 100 as shown in FIG. 1B, the method includes configuring the single antenna 110c (single polarized) to transmit and receive radio signals for measurement. The method includes arranging the antenna 110c in the first orientation such that the polarization of the antenna 110c is perpendicular to the orientation axis 202 of the embedded object 200. The method includes moving the antenna 110c in the first orientation across the structure 210, i.e. across the surface 220 and along the scanning trace 222. The method includes transmitting radio signals from the antenna 110c in the first orientation into the structure 210 as the antenna 110c moves across the structure 210 and passes over the embedded object 200. The method includes measuring, from the antenna 110c in the first orientation, the radio signals transmitted from the antenna 110c and reflected from the embedded object 200. The method includes generating the first representation 250 of the embedded object 200 based on the measured radio signals from the antenna 110c in the first orientation. The method includes arranging the antenna 110c in the second orientation such that the polarization of the antenna 110c is parallel to the orientation axis 202 of the embedded object 200. The method includes moving the antenna 110c in the second orientation across the structure 210, i.e. across the surface 220 and reversely along the scanning trace 222. The method includes transmitting radio signals from the antenna 110c in the second orientation into the structure 210 as the antenna 110c moves across the structure 210 and passes over the embedded object 200. The method includes measuring, from the antenna 110c in the second orientation, the radio signals transmitted from the antenna 110c and reflected from the embedded object 200. The method includes generating the second representation 260 of the embedded object 200 based on the measured radio signals from the antenna 110c in the second orientation. The method includes measuring the size of the embedded object 200 from the first representation 250 and the second representation 260.

It will be appreciated that the first orientation of the single antenna 110c can be such that the antenna polarization is one of perpendicular and parallel to the orientation axis 202, and the second orientation can be such that the antenna polarization is the other of perpendicular and parallel to the orientation axis 202. For example, in the first orientation, the antenna polarization is parallel to the orientation axis 202, and in the second orientation, the antenna polarization is perpendicular to the orientation axis 202.

In many embodiments, the object 200 is a cylindrical rebar 200 and the structure 210 is a concrete structure 210, thus resulting in a reinforced concrete structure. The orientation axis 202 is thus the longitudinal axis of the cylindrical rebar 200. It will be appreciated that the rebar 200 may be of other shapes, and the apparatus 100 and method may be used to measure various objects 200 embedded in various structures 210.

Accordingly, the antennas 110 are configured to transmit radio signals to measure the rebar 200 embedded below the surface 220 of the concrete structure 210. More specifically, the measurement instrument 120 makes use of ground-penetrating radar (GPR) to transmit the radio signals, such as in pulses, to measure the embedded rebar 200. GPR is based on electromagnetic wave propagation and reflection to measure the embedded rebar 200 due to the difference in dielectric permittivity and conductivity of different materials, i.e. the steel rebar 200 and concrete structure 210. GPR is effective in measuring rebars 200 because of the high permittivity contrast between the steel material and the concrete material of the surrounding structure 210.

Figure 3A:
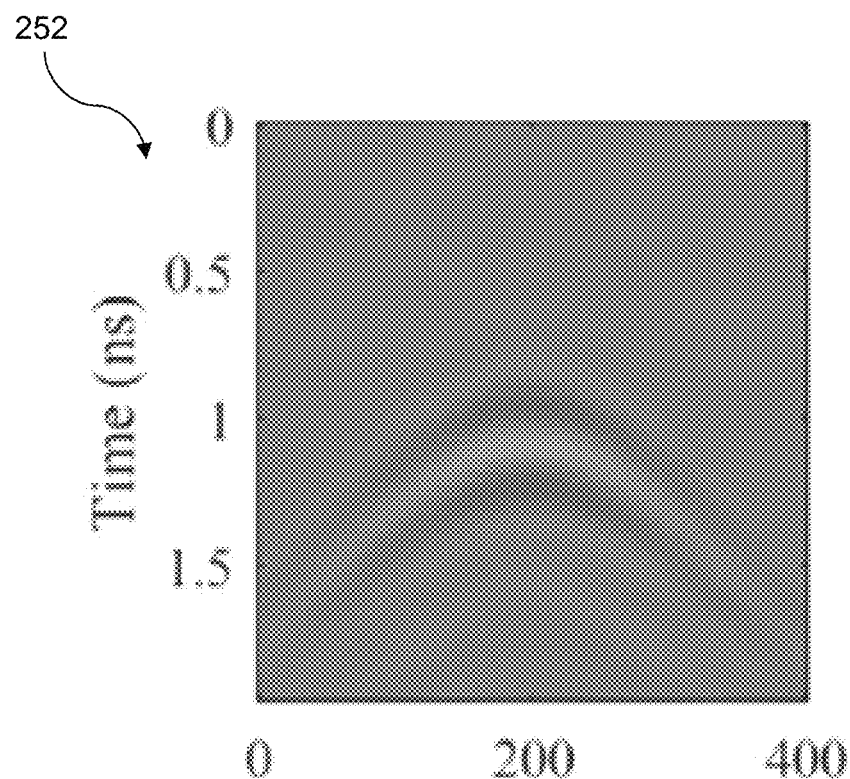
FIGS. 3A and 3B are illustrations of the denoised representations.
Figure 3B:
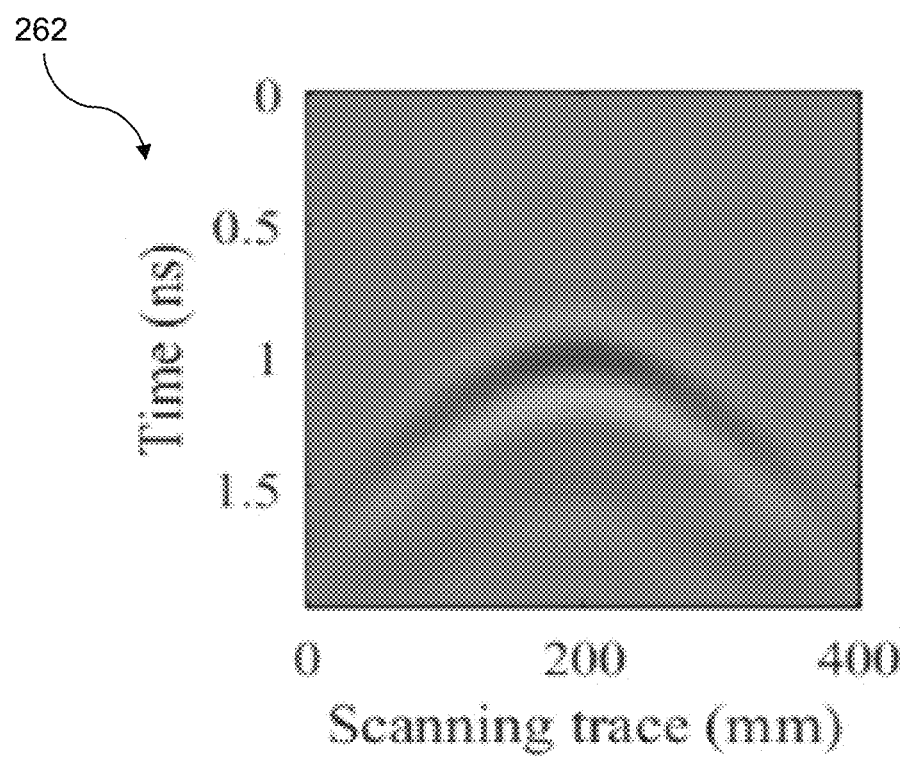

In many embodiments, the size of the embedded rebar 200 is measured from respective maximum amplitudes of the first and second representations 250,260. Preferably, measuring the size of the rebar 200 includes denoising the first and second representations 250,260. For example, the denoising is done by processing the first and second representations 250,260 to remove the background clutter and reveal the reflection signature of the rebar 200. The representations 250,260 may be radargram images and FIGS. 3A and 3B show the denoised first representation 252 and the denoised second representation 262.

As GPR uses a broadband frequency range for high detection resolution and accuracy, instead of using a single frequency point, it is more reliable to calculate the power ratio PR of the radio signals reflected by the embedded rebar 200 and received by the antennas 110 in the time domain. As shown in Equation 1, the power ratio PR or the radar cross section (RCS) ratio is defined as the square of the ratio between the maximum amplitude of the first representation 250 (perpendicular polarization) and the maximum amplitude of the second representation 260 (parallel polarization).

$$PR = \frac{P_{r\perp}}{P_{r\|}} = \left(\frac{A_{r\perp max}}{A_{r\|max}}\right)^2 \qquad \text{(Equation 1)}$$

The maximum amplitudes in the time domain can be calculated based on the inverse Fourier transform, as shown in Equations 2 and 3. $X_{r\perp}(f_k)$ and $X_{r\|}(f_k)$ are complex numbers that include both amplitude and phase of the radio signals at the frequency point $f_k$. k is the number of a frequency sample, N is the total number of frequency samples within the frequency range, and $s_t$ is the number of the time sample corresponding to the maximum amplitude.

$$A_{r\perp max} = \left|\frac{1}{N}\sum_{k=0}^{N-1} X_{r\perp}(f_k)e^{j\frac{2\pi s_t k}{N}}\right| \qquad \text{(Equation 2)}$$

$$A_{r\|max} = \left|\frac{1}{N}\sum_{k=0}^{N-1} X_{r\|}(f_k)e^{j\frac{2\pi s_t k}{N}}\right| \qquad \text{(Equation 3)}$$

Further, the reflected radio signals received by the dual-polarized antennas 110 satisfy Equation 4. σ represents the scattering width or the scattering cross section per unit length of the rebar 200.

$$\frac{X_{r\perp}(f_k)}{X_{r\|}(f_k)} = \sqrt{\frac{\sigma_\perp(f_k)}{\sigma_\|(f_k)}} \qquad \text{(Equation 4)}$$

Figure 4A:
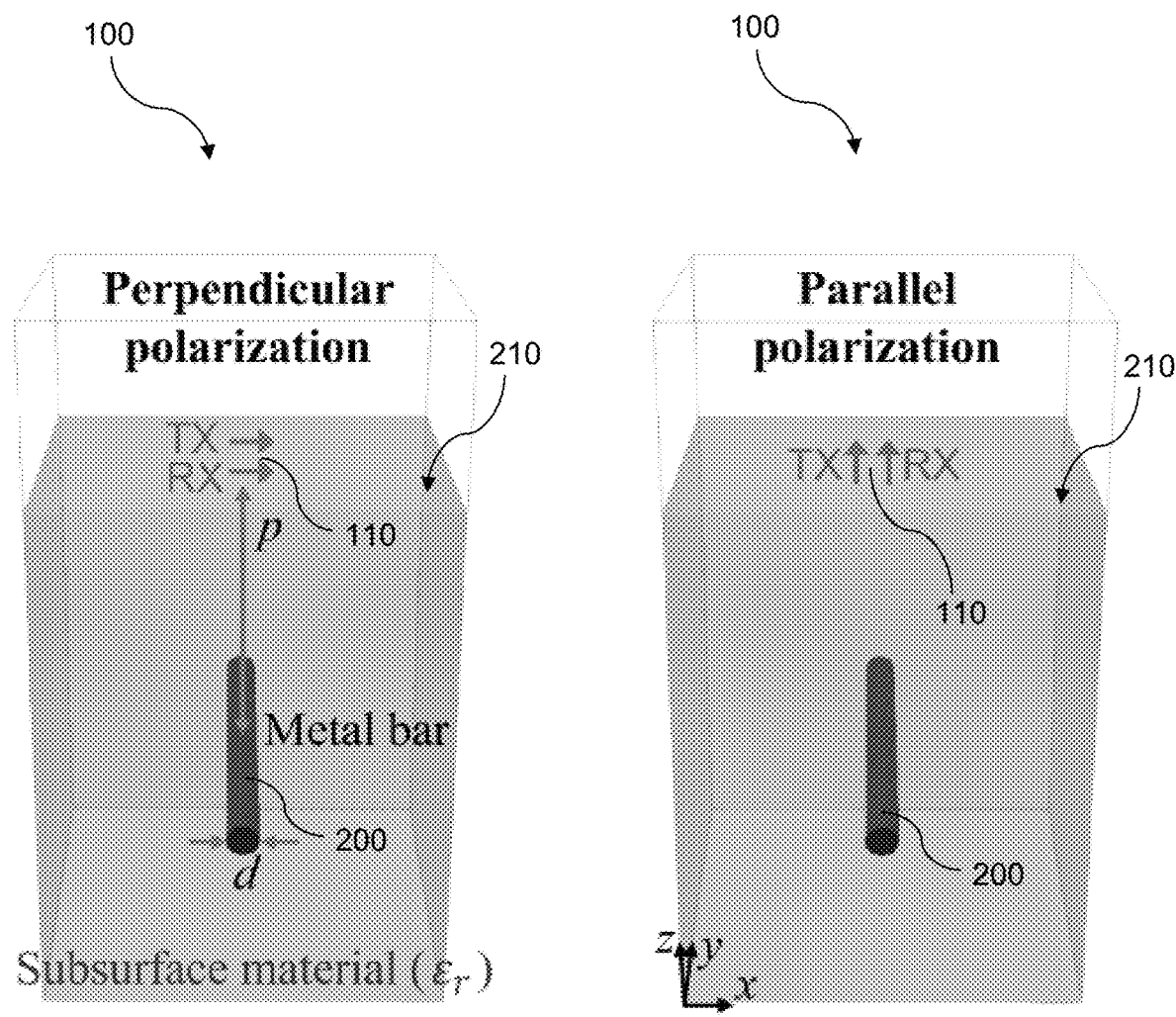
FIGS. 4A to 4E are illustrations of a numerical simulation for measuring a rebar.

In the backscattering scenario as shown in FIG. 4A, the scattering widths of the rebar 200 for the perpendicular and parallel polarized electric fields at frequency $f_0$ under the far field conditions ($p \gg \lambda_0$ and $\beta_p \gg (\beta\alpha)^2$) are calculated using Equations 5 to 8. p is the distance between the antennas 110 and the rebar 200. α is the radius of the rebar 200. $\lambda_0$ is the wavelength of the radio signals. $J_n(\cdot)$ is the usual cylindrical Bessel function of order n. $H_n^{(1)}(\cdot)$ is a cylindrical Hankel function of the first kind of order n. c is the speed of light. $\epsilon_r$ is the relative permittivity of the surrounding subsurface structure 210 or medium.

$$\sigma_\perp = \frac{4}{\beta}\left|\sum_{n=0}^{\infty}(-1)^{n+1}\zeta_n \frac{J_n'(\beta a)}{H_n^{(1)\prime}(\beta a)}\right|^2 \qquad \text{(Equation 5)}$$

$$\sigma_\| = \frac{4}{\beta}\left|\sum_{n=0}^{\infty}(-1)^{n+1}\zeta_n \frac{J_n(\beta a)}{H_n^{(1)}(\beta a)}\right|^2 \qquad \text{(Equation 6)}$$

$$\beta = \frac{2\pi f_0 \sqrt{\epsilon_r}}{c} \qquad \text{(Equation 7)}$$

$$\zeta_n = \begin{cases} 1 \text{ for } n=0 \\ 2 \text{ for } n=1,2,3,\ldots \end{cases} \qquad \text{(Equation 8)}$$

As shown above, the scattering widths are directly related to the radius of the rebar 200. These equations allow a theoretical relationship to be built between the radius of the rebar 200 and the power ratio of the reflected radio signals received by dual-polarized antennas 110 at frequency $f_0$. The expanded power ratio can thus be defined using Equations 9 and 10.

$$\frac{P_{r\perp}}{P_{r\parallel}} = \tag{Equation 9}$$

$$\left(\frac{\sum_{k=0}^{N-1} X_{r\perp}(f_k) e^{j\frac{2\pi s_t k}{N}}}{\sum_{k=0}^{N-1} X_{r\parallel}(f_k) e^{j\frac{2\pi s_t k}{N}}}\right)^2 = \left(\frac{\sum_{k=0}^{N-1} X_{r\parallel}(f_k) \sqrt{\frac{\sigma_\perp(f_k)}{\sigma_\parallel(f_k)}} e^{j\frac{2\pi s_t k}{N}}}{\sum_{k=0}^{N-1} X_{r\parallel}(f_k) e^{j\frac{2\pi s_t k}{N}}}\right)^2$$

$$\frac{P_{r\perp}}{P_{r\parallel}} = \left(\frac{\sum_{k=0}^{N-1} X_{r\parallel}(f_k) \left|\frac{\sum_{n=0}^{\infty}(-1)^{n+1}\zeta_n \frac{J'_n(\beta a)}{H_n^{(1)'}(\beta a)}}{\sum_{n=0}^{\infty}(-1)^{n+1}\zeta_n \frac{J_n(\beta a)}{H_n^{(1)}(\beta a)}}\right| e^{j\frac{2\pi s_t k}{N}}}{\sum_{k=0}^{N-1} X_{r\parallel}(f_k) e^{j\frac{2\pi s_t k}{N}}}\right)^2 \tag{Equation 10}$$

Equation 10 thus builds the theoretical relationship between the power ratio PR and the size of the rebar 200. The size of the rebar 200, such as the radius $\alpha$ or the diameter, can be measured based on the theoretical relationship by finding the estimated diameter corresponding to the calculated power ratio.

A numerical simulation was conducted to build and evaluate the measurement method using this theoretical relationship. An electromagnetic simulation software, such as gprMax, was used to perform the numerical simulation. FIG. 4A shows the simulation scenario wherein an impulse GPR was used to measure a cylindrical rebar 200 embedded in a structure 210. The simulated domain covered an area of 0.3×0.3×0.7 m³. The cylindrical rebar 200 was made of the perfect electric conductor (PEC) material. The orientation or longitudinal axis 202 of the cylindrical rebar 200 was parallel to the y-axis and positioned at 0.15 m along the x-axis. The absorbing boundary condition was applied to reduce the boundary reflections.

The first antenna 110a had perpendicular polarization relative to the cylindrical rebar 200 and the second antenna 110b had parallel polarization relative to the cylindrical rebar 200. Each antenna 110 included a hertzian dipole and a probe that were used as the transmitter TX and receiver RX respectively. For each antenna 110, the transmitter TX and receiver RX were spaced 10 mm apart and arranged on the surface 220 with their common middle point at 0.15 m along the x-axis and y-axis. The distance between the antennas 110 and the rebar 200, i.e. the cover depth p of the rebar 200 in the structure 210, was 30 cm. The diameter d of the rebar 200 was 12 mm. The radio signals transmitted by the antennas 110 had a Ricker waveform with a 1.0 GHz central frequency.

The relative permittivity $\epsilon_r$ of the subsurface structure 210 was predetermined. It will be appreciated that the relative permittivity can be predetermined using suitable methods, such as GPR methods like the curve fitting method and the delay time-velocity method using an object of known depth. Further, for a given subsurface permittivity value, the relationship between the power ratio and the rebar diameter is relatively stable, and is insensitive to the rebar cover depth and subsurface conductivity.

Figure 4B:
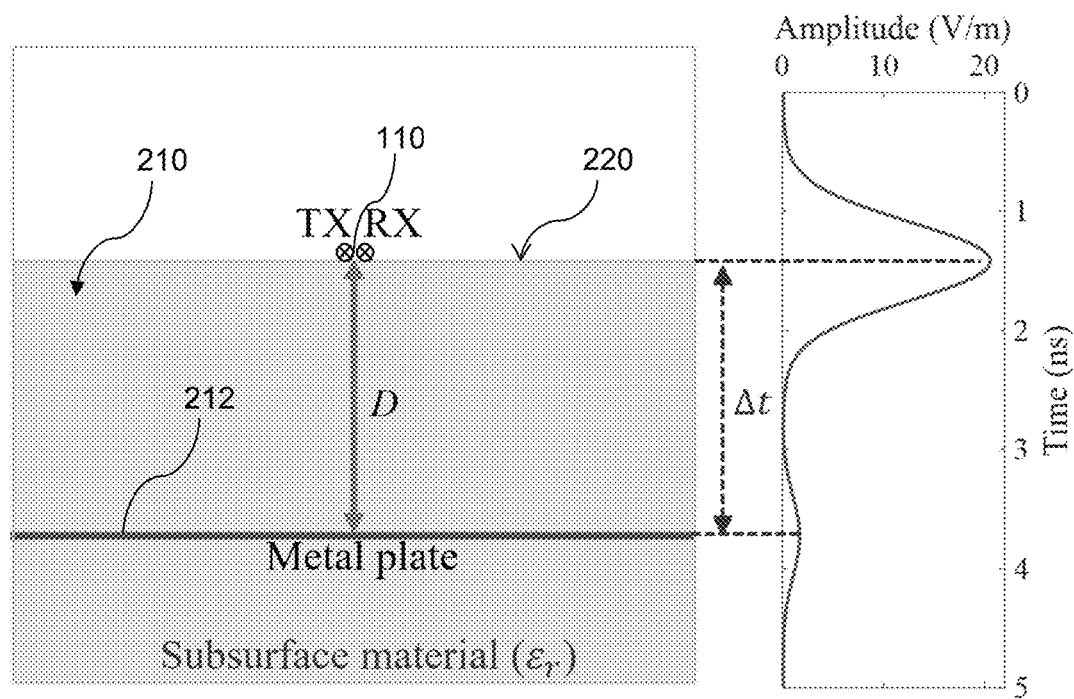

In the numerical simulation, the relative permittivity was predetermined by placing a metal plate 212 at a depth D of 20 cm in the structure 210 and measuring the delay time from the surface 220 to the plate 212, as shown in FIG. 4B. The relative permittivity was calculated as shown in Equation 11.

$$\varepsilon_r = \left(\frac{c\Delta t}{2D}\right)^2 = 3.0 \tag{Equation 11}$$

Figure 4C:
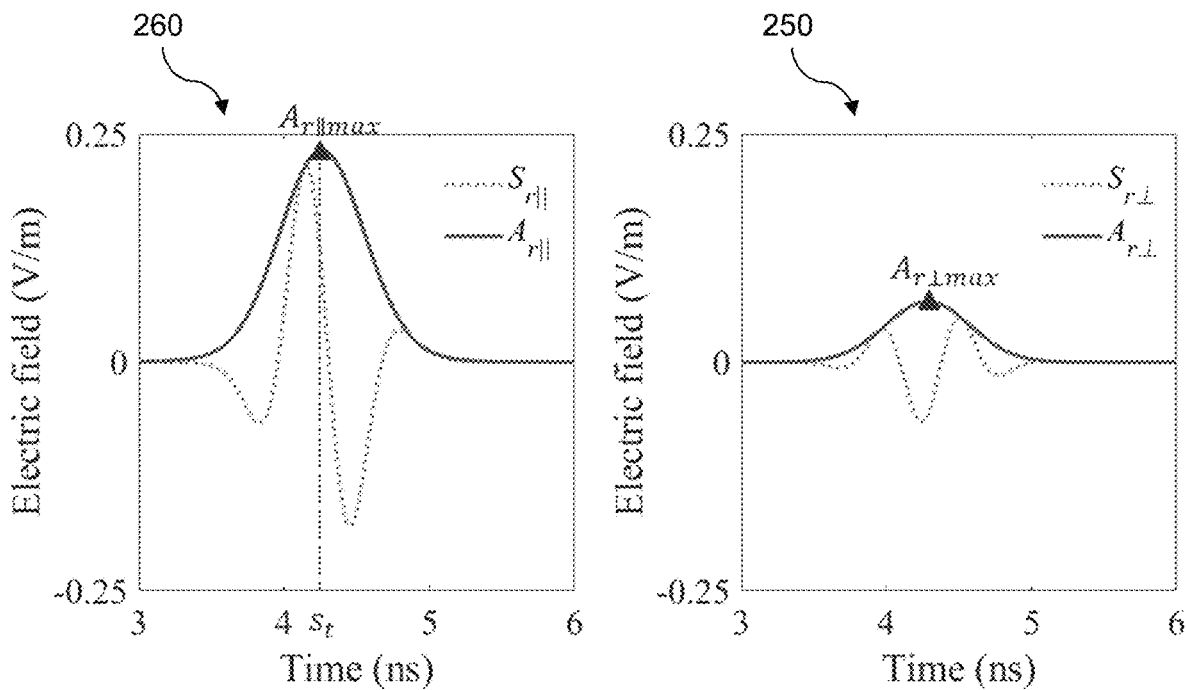

Radio signals were transmitted from the antennas 110 into the structure 210 and reflected from the embedded rebar 200. The reflected radio signals were measured by the perpendicular-polarized first antenna 110a ($S_{r\perp}$) and the parallel-polarized second antenna 110b ($S_{r\parallel}$). Representations 250, 260 of the rebar 200 were generated based on the measured radio signals and the amplitudes in the representations 250,260 were then obtained, as shown in FIG. 4C. Using Equation 1, the power ratio was calculated to be 0.0818. The number of the time sample ($s_t$) corresponding to the maximum amplitude was also obtained from the representations 250,260.

Figure 4D:
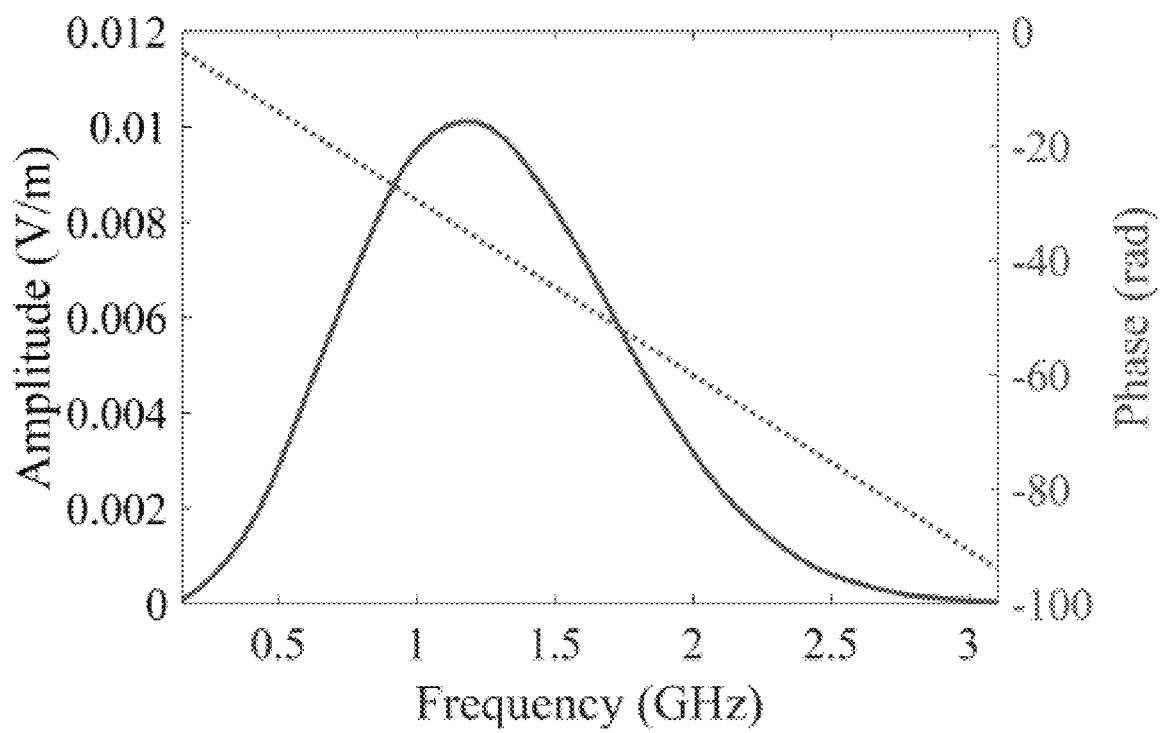
Figure 4E:
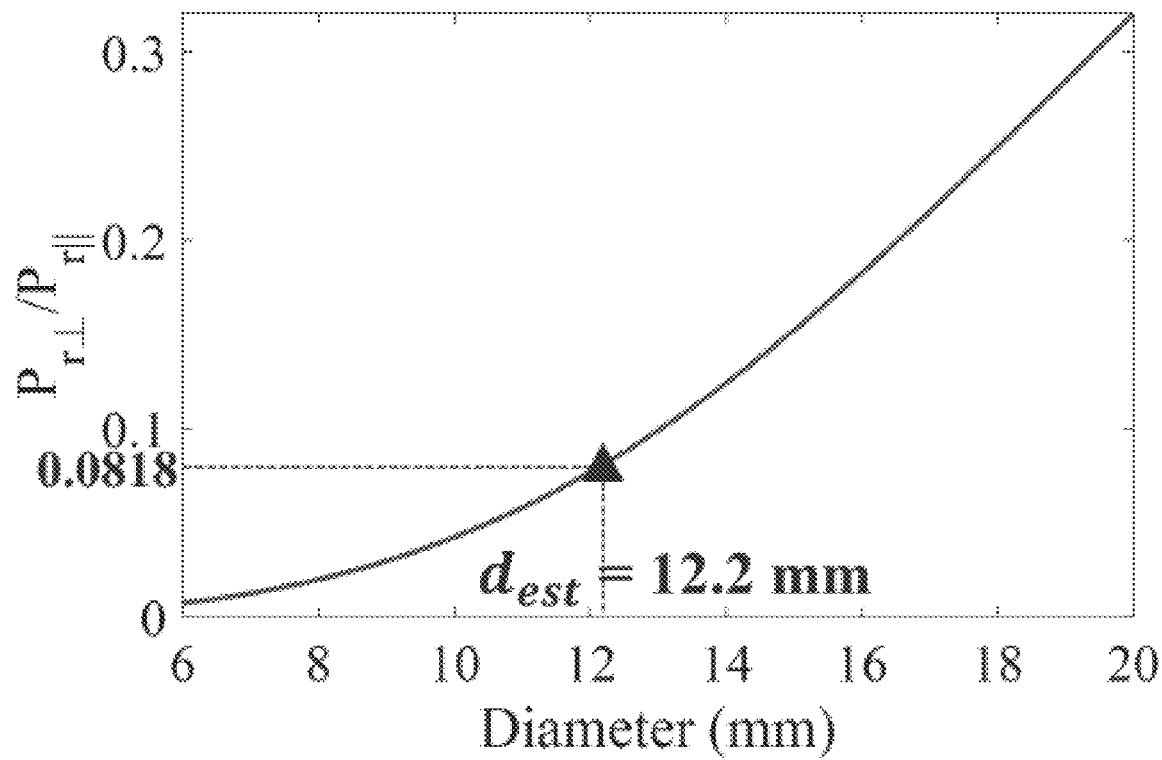

The spectrum $X_{r\parallel}(f_k)$ was then obtained by applying Fourier transform to the radio signals measured by the parallel-polarized second antenna 110, as shown in FIG. 4D. The power ratios of a set of rebar diameters were calculated by substituting the number of the time sample $s_t$, spectrum $X_{r\parallel}(f_k)$, and relative permittivity $\epsilon_r$ into Equation 10. FIG. 4E shows the resulting curve that defines the theoretical relationship between the power ratio and the rebar diameter. Given that the power ratio was previously calculated to be 0.0818, the corresponding rebar diameter was estimated to be 12.2 mm. The estimated diameter was very close to the actual diameter (12 mm) with a percentage error of 1.7%, demonstrating the effectiveness of using this method to measure the rebar 200.

Another numerical simulation was conducted to evaluate the measurement method for different sizes of rebars 200 embedded at different cover depths p. The simulation scenario was built similarly to that as shown in FIG. 4A. The rebars 200 had diameters of 6 mm, 8 mm, 10 mm, 12 mm, 14 mm, 16 mm, 18 mm, and 20 mm. The rebars 200 were embedded at cover depths p of 5 cm, 10 cm, 20 cm, 30 cm, 40 cm, and 80 cm. The radio signals transmitted by the antennas 110 had a Ricker waveform with a 1.0 GHz central frequency and the relative permittivity was set as 3.0.

Figure 5A:
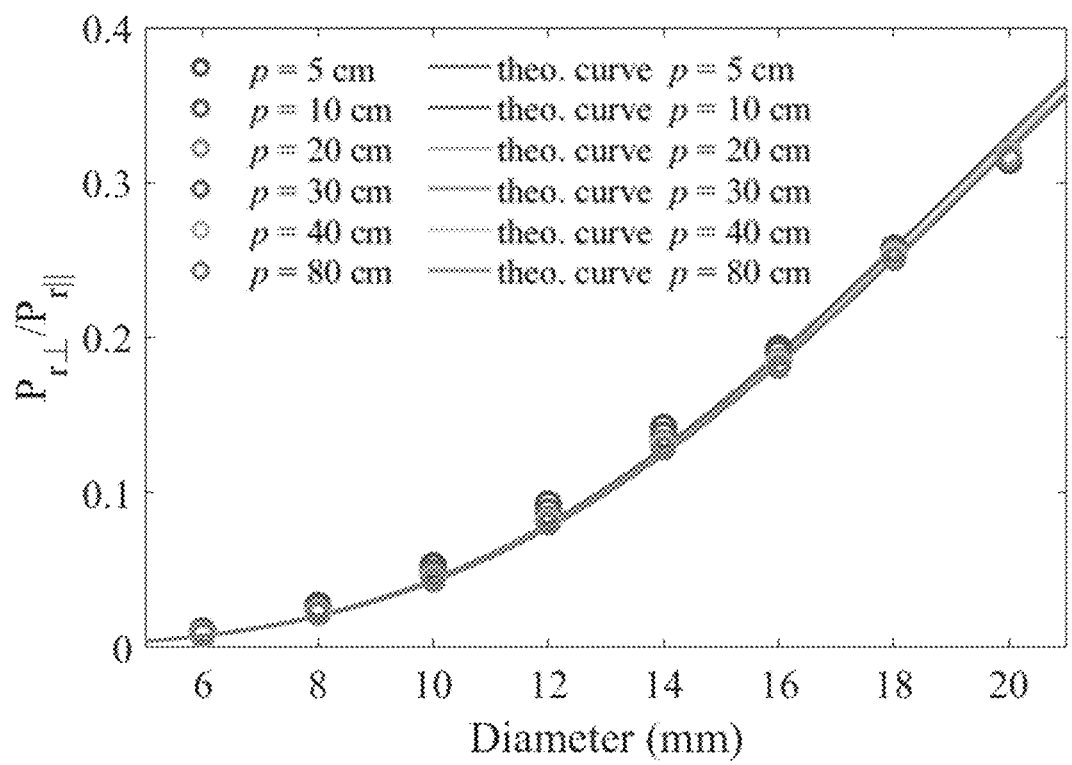
FIGS. 5A to 5C are illustrations of a numerical simulation for measuring rebars of different diameters and depths.

Equation 10 was used to calculate the theoretical relationships between the power ratios and the different rebar diameters at different cover depths. FIG. 5A shows the resulting curves that define the theoretical relationships. It can be seen that the curves overlap with each other, especially for cover depths over 20 cm, which shows that the theoretical relationship between the power ratio and the rebar diameter is generally independent of the cover depth.

Figure 5B:
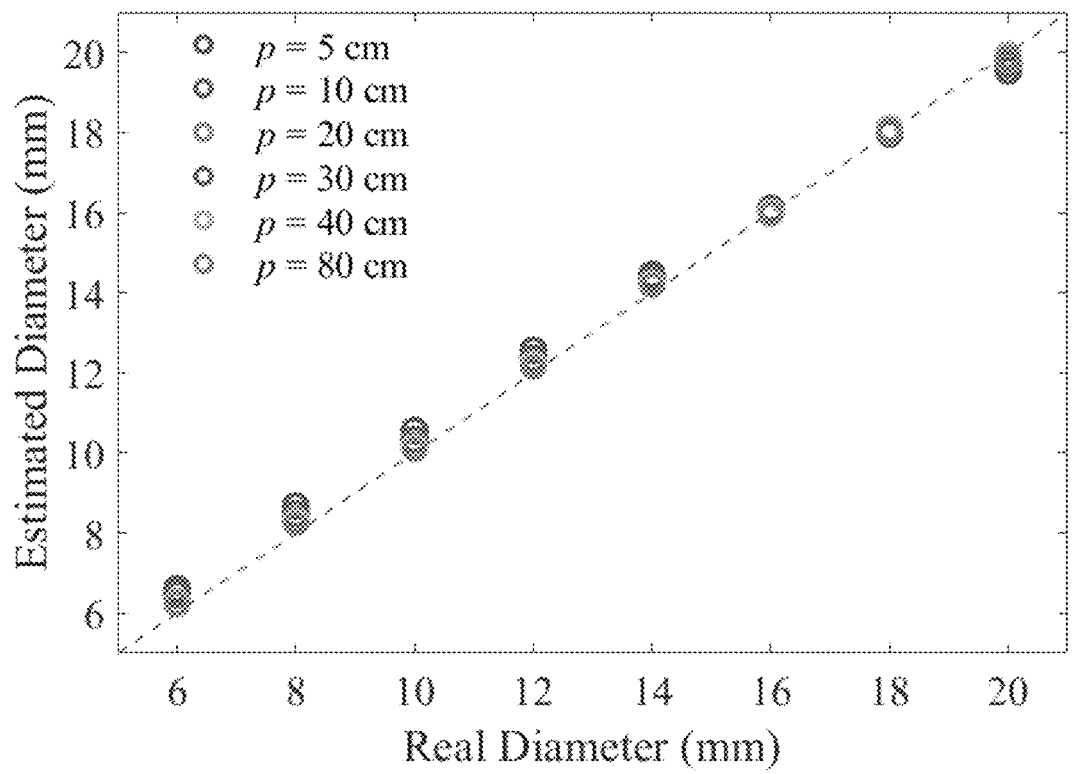
Figure 5C:
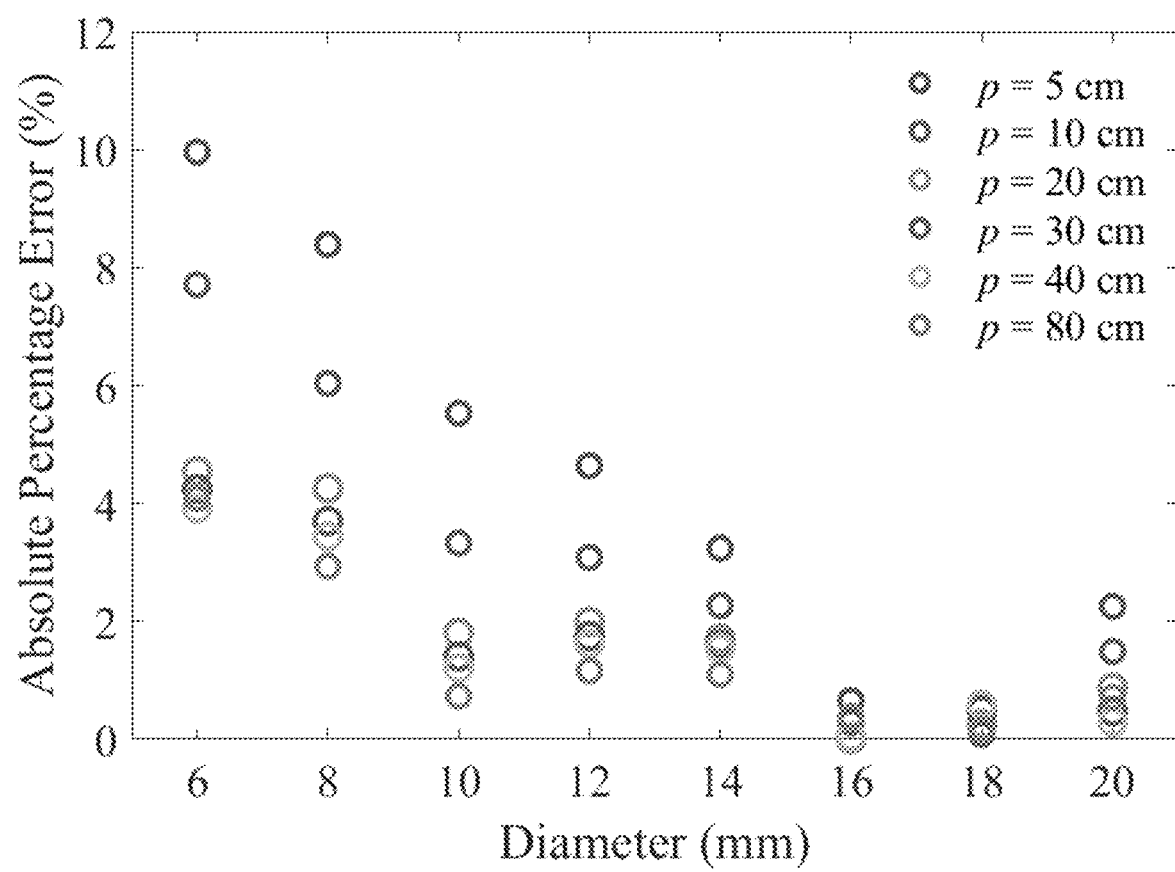

As shown in FIG. 5A, the calculated power ratios at the different rebar diameters fit well with the curves. The rebar diameters were estimated using the curves and the calculated power ratios, as shown in FIG. 5B. The percentage errors between the estimated diameters and the actual diameters are shown in FIG. 5C. It can be seen that the estimated diameters were close to the actual diameters, with percentage errors of less than 10%. The percentage error was more evident for rebars 200 at shallower cover depths, but the measurement accuracy improved significantly as the cover depth increases. Particularly, the percentage error was less than 5% for cover depths of 20 cm and more.

Another numerical simulation was conducted to evaluate the measurement method for different operating frequencies of the radio signals. The rebars 200 had diameters of 6 mm, 8 mm, 10 mm, 12 mm, 14 mm, 16 mm, 18 mm, and 20 mm. The rebars 200 were embedded at a cover depth of 30 cm. The radio signals transmitted by the antennas 110 had a Ricker waveform with central frequencies of 1.0 GHz, 1.3 GHz, and 1.6 GHz. The relative permittivity was set as 1.0.

Figure 6A:
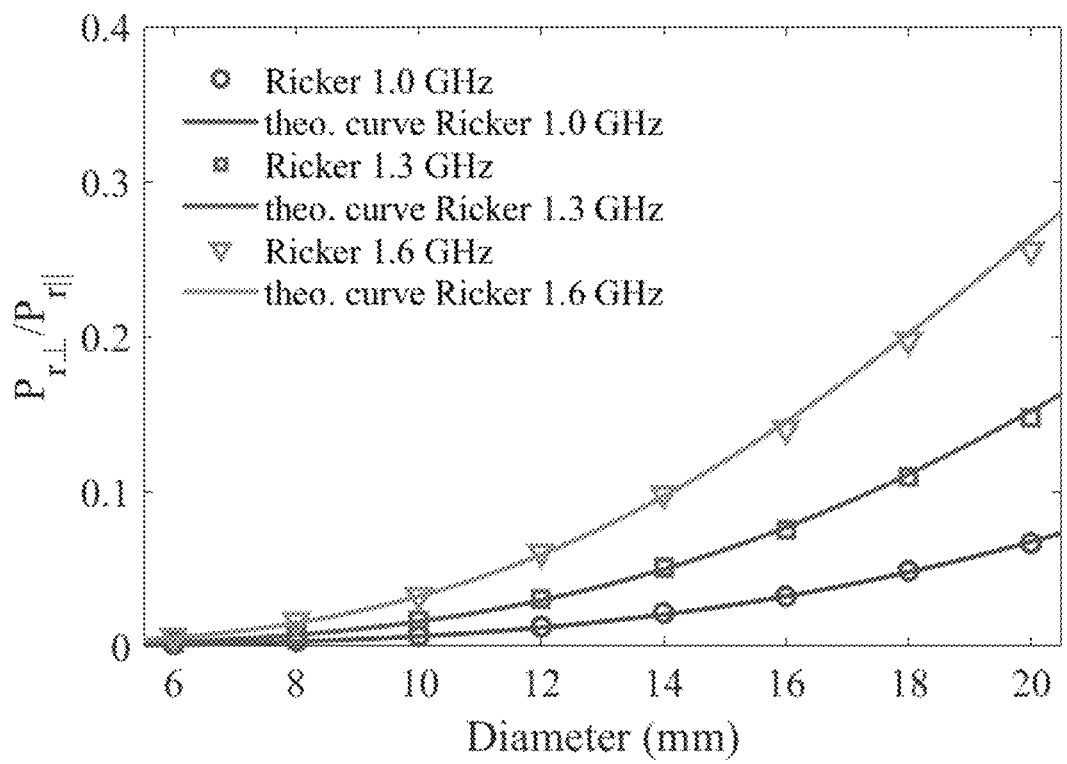
FIGS. 6A and 6B are illustrations of a numerical simulation for measuring rebars using different frequencies.
Figure 6B:
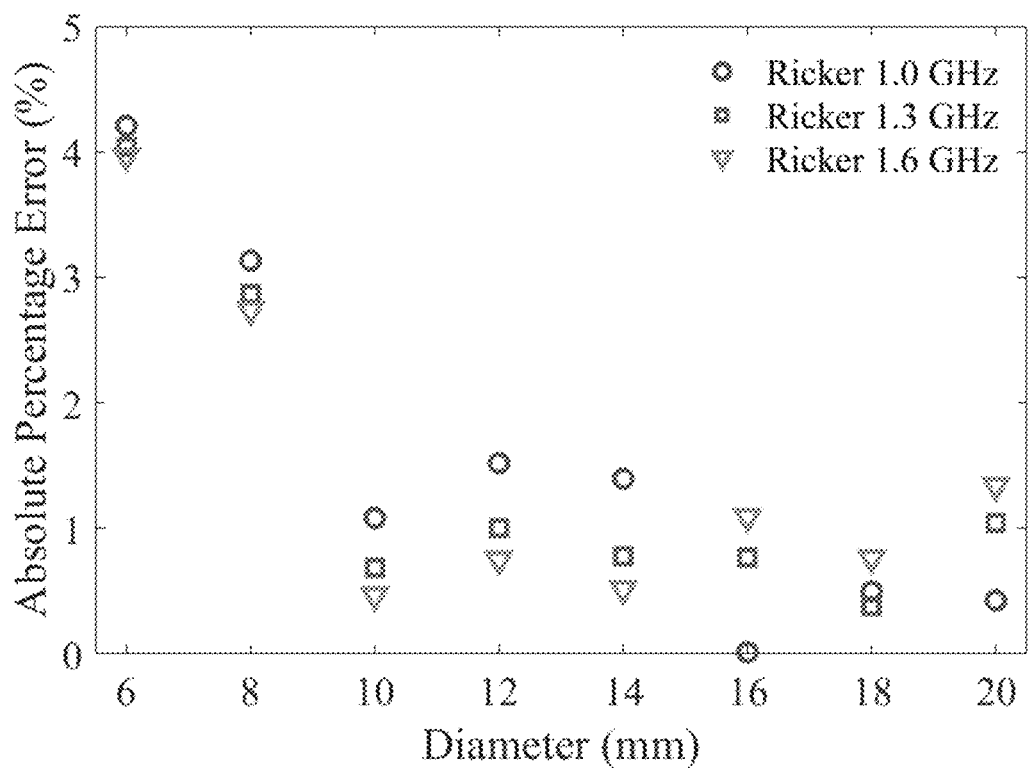

The theoretical relationships between the power ratios and the different rebar diameters were calculated for the different central frequencies and shown in FIG. 6A. It can be seen that as the central frequency increased, the power ratio for a rebar 200 of the same diameter also increased. The rebar diameters were estimated from the power ratios and the percentage errors between the estimated diameters and the actual diameters are shown in FIG. 6B. It can be seen that the estimated diameters were very close to the actual diameters, with the maximum percentage error being 4.25% and most below 2%. The results demonstrate the effectiveness of using this method to measure the rebar 200 using radio signals of different frequencies.

Another numerical simulation was conducted to evaluate the measurement method for different relative permittivity values $\epsilon_r$. The rebars 200 had diameters of 6 mm, 8 mm, 10 mm, 12 mm, 14 mm, 16 mm, 18 mm, and 20 mm. The rebars 200 were embedded at a cover depth of 30 cm. The radio signals transmitted by the antennas 110 had a Ricker waveform with a central frequency of 1.0 GHz. The relative permittivity $\epsilon_r$ was set as 1.0, 3.0, 5.0, and 7.0.

Figure 7A:
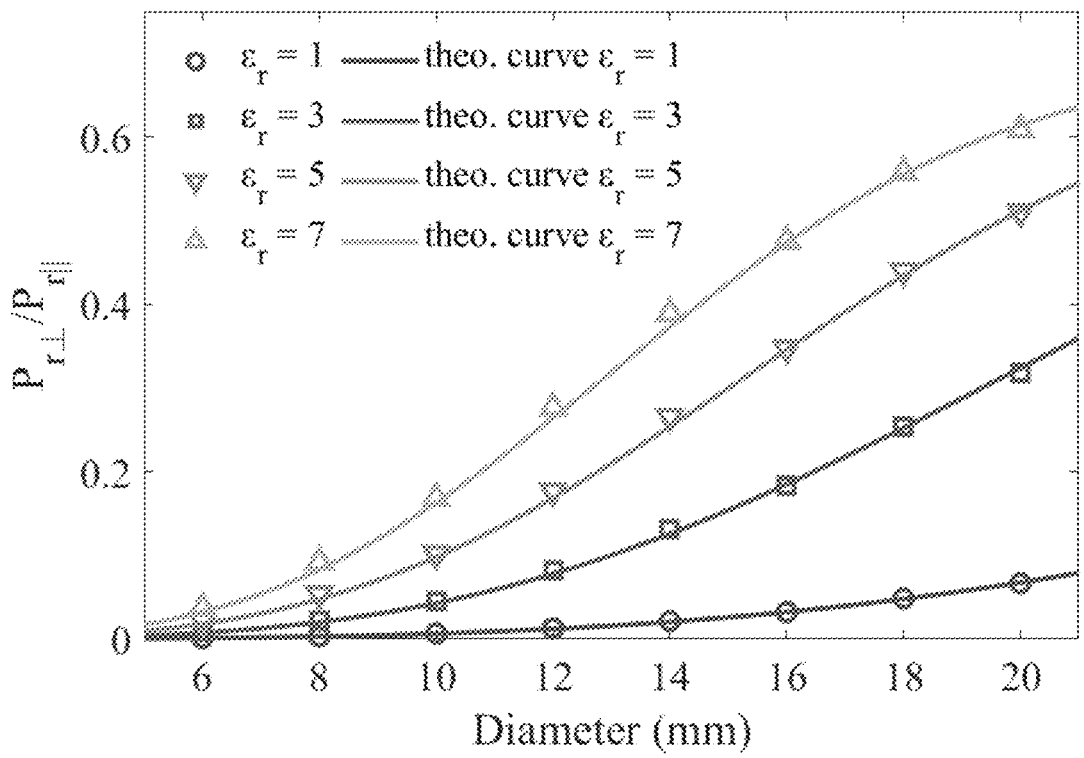
FIGS. 7A and 7B are illustrations of a numerical simulation for measuring rebars using different relative permittivity values.
Figure 7B:
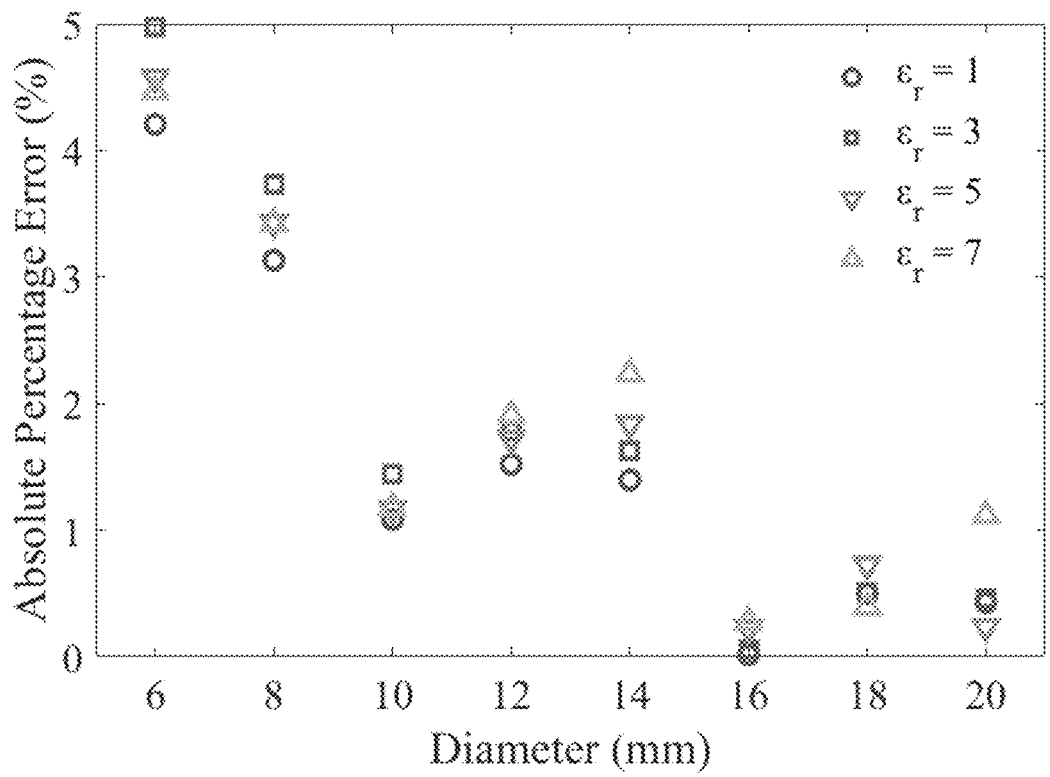

The theoretical relationships between the power ratios and the different rebar diameters were calculated for the different relative permittivity values and shown in FIG. 7A. It can be seen that as the relative permittivity increased, the electrical size of the rebar 200 becomes larger, leading to an increase in the power ratio. The rebar diameters were estimated from the power ratios and the percentage errors between the estimated diameters and the actual diameters are shown in FIG. 7B. It can be seen that the estimated diameters were very close to the actual diameters, with percentage errors of less than 5%. The results demonstrate the effectiveness of using this method to measure the rebar 200 embedded in different structures 210 or mediums of different relative permittivity values.

Figure 8:
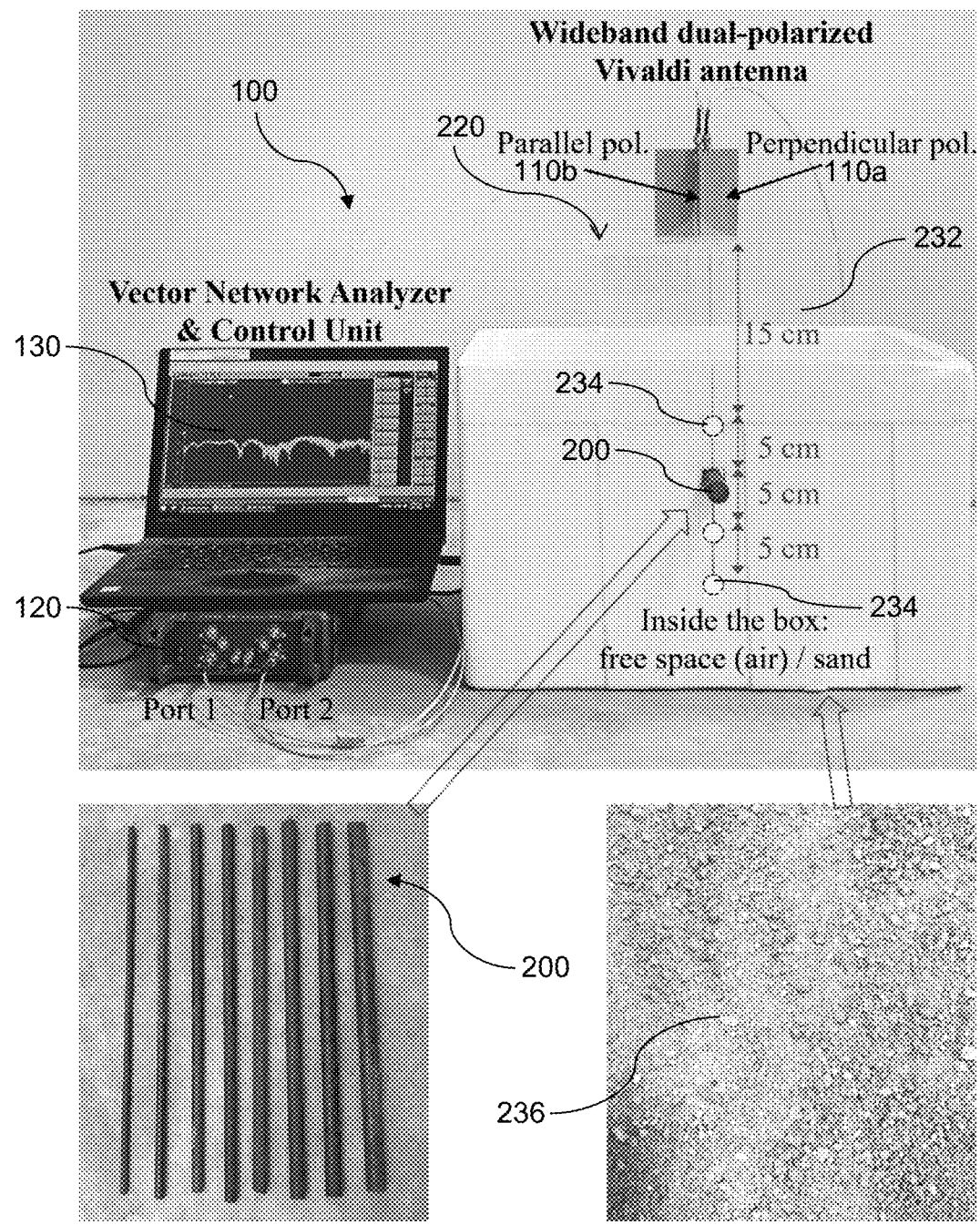
FIG. 8 is an illustration of a physical experiment for measuring rebars of different diameters and depths.

Physical experiments were conducted to further evaluate the apparatus 100 and measurement method in real cases. FIG. 8 shows the apparatus 100 that was used to conduct the experiments. The measurement instrument 120 was a vector network analyzer and the structure 210 included a foam box 230. Dual-polarized Vivaldi antennas 110 were used and the antennas 110 were placed on an acrylic fixture 232 on the foam box 230. Four sets of holes 234 at depths of 15 cm, 20 cm, 25 cm, and 30 cm were formed in the foam box 230. The holes 234 were measured relative to the antennas 110, i.e. the surface 220 was the top of the acrylic fixture 232 where the antennas 110 were placed. Eight rebars 200 of different diameters—measured using a calliper as 7 mm, 10 mm, 11.5 mm, 13 mm, 15 mm, and 16 mm—were inserted into the foam box 230 through the holes 234.

Figure 9A:
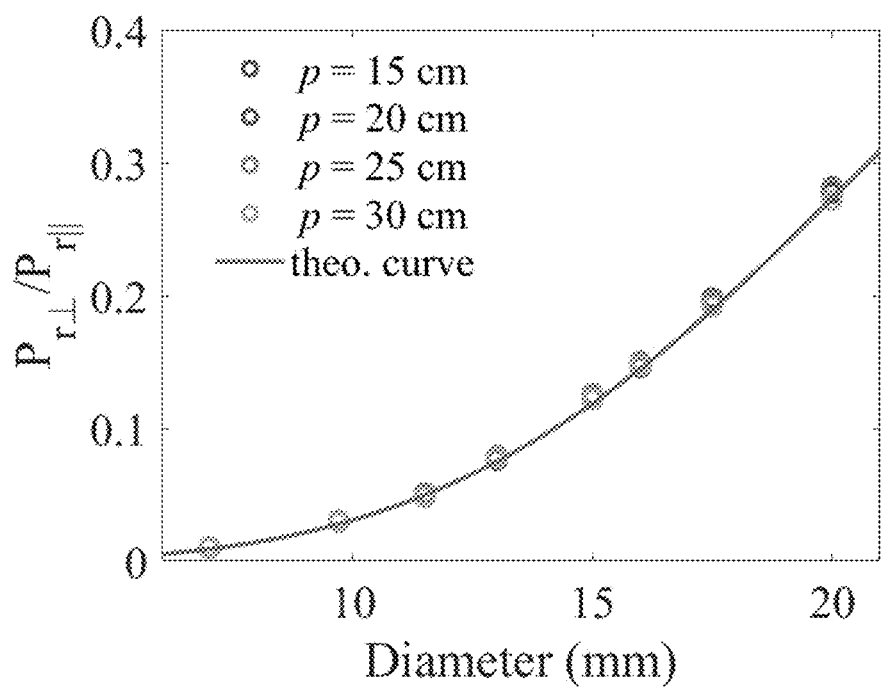
FIGS. 9A and 9B are illustrations of a physical experiment for measuring rebars embedded in air.
Figure 9B:
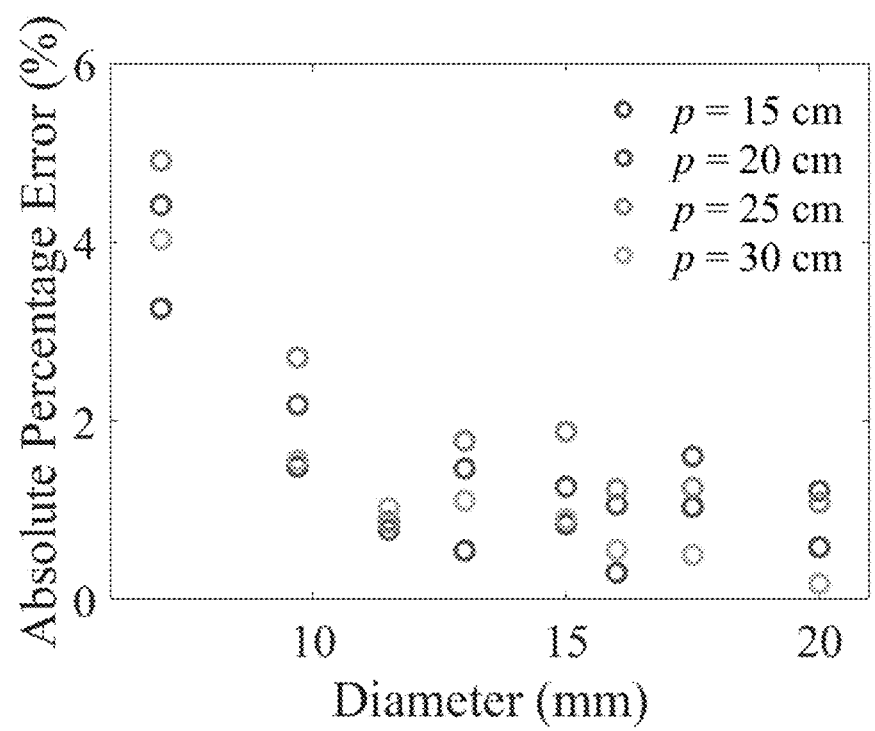

In one experiment, the foam box 230 was filled with air. Each rebar 200 was inserted at each depth and the rebar 200 was measured using radio signals in the frequency domain 0.5 GHz to 3.3 GHz. The relationship between the measured power ratios and the different rebar diameters at different depths is shown in FIG. 9A. It can be seen that the power ratios of the same rebar 200 at different depths were almost identical, verifying that the power ratio is generally independent of the depth. The rebar diameters were estimated from the power ratios and the percentage errors between the estimated diameters and the actual diameters are shown in FIG. 9B. It can be seen that the estimated diameters were very close to the actual diameters, with percentage errors of less than 6% and most below 3%.

Figure 10A:
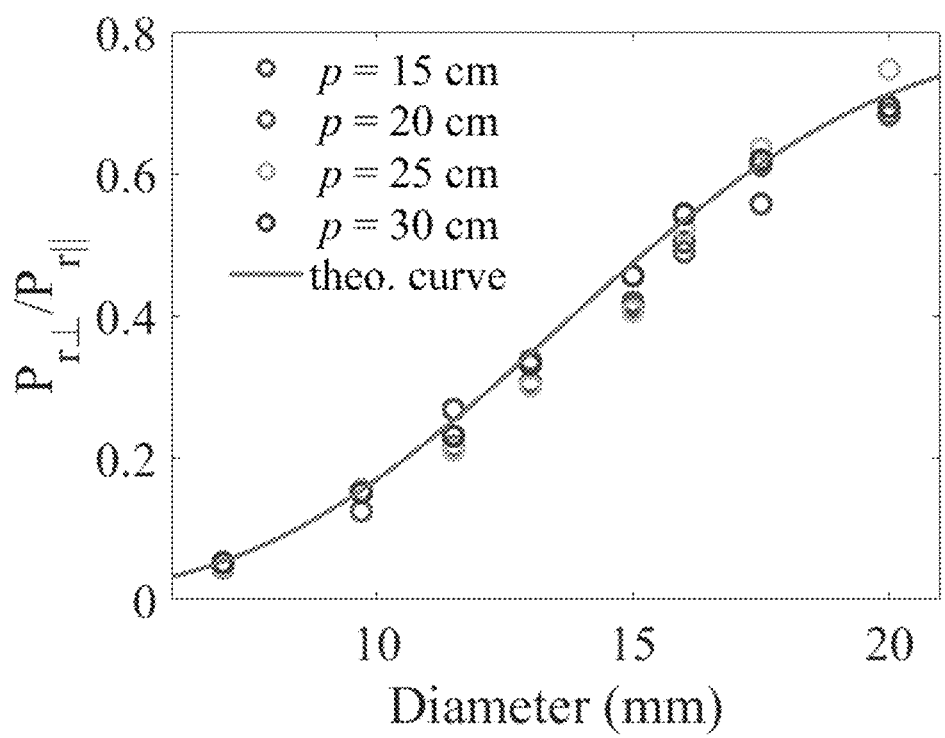
FIGS. 10A and 10B are illustrations of a physical experiment for measuring rebars embedded in sand.
Figure 10B:
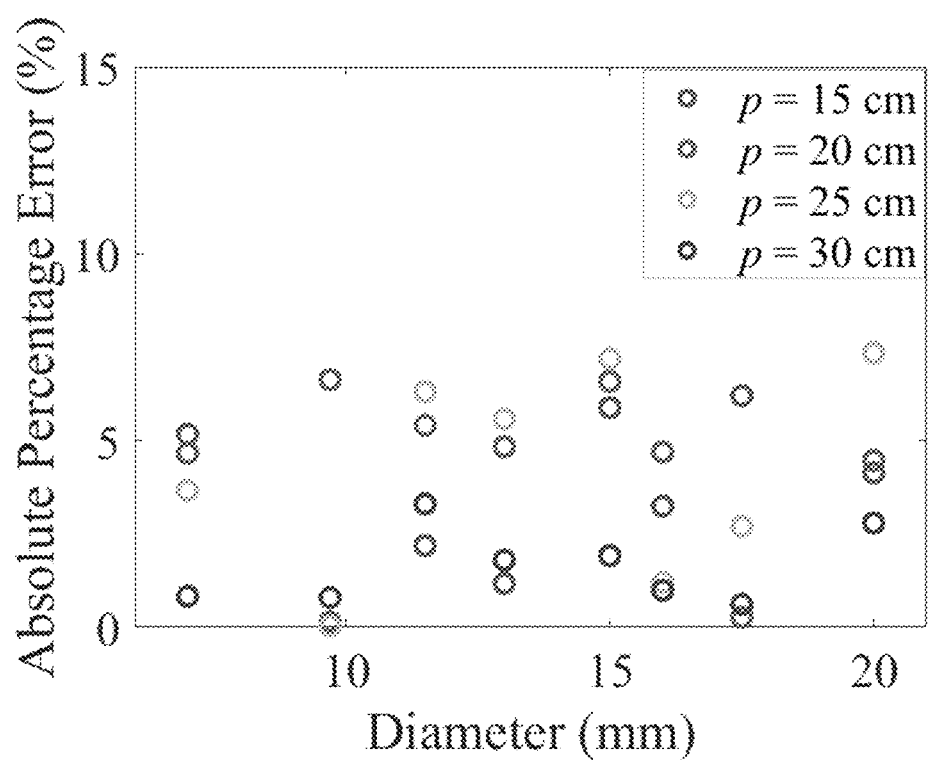

In another experiment, the foam box 230 was filled with sand 236 instead of air. Each rebar 200 was inserted at each depth and the rebar 200 was measured using radio signals in the frequency domain 0.5 GHz to 3.3 GHz. The relatively permittivity value of the sand 236 was predetermined to be 2.66. The relationship between the measured power ratios and the different rebar diameters at different depths is shown in FIG. 10A. It can be seen that the measured power ratios were close to their corresponding theoretical values. The rebar diameters were estimated from the power ratios and the percentage errors between the estimated diameters and the actual diameters are shown in FIG. 10B. It can be seen that the percentage errors were all less than 10%.

The results demonstrate the effectiveness of using this method in real cases to measure rebars 200 that are embedded at different depths in different structures 210 or mediums, such as air and sand as shown by the above experiments.

Figure 11A:
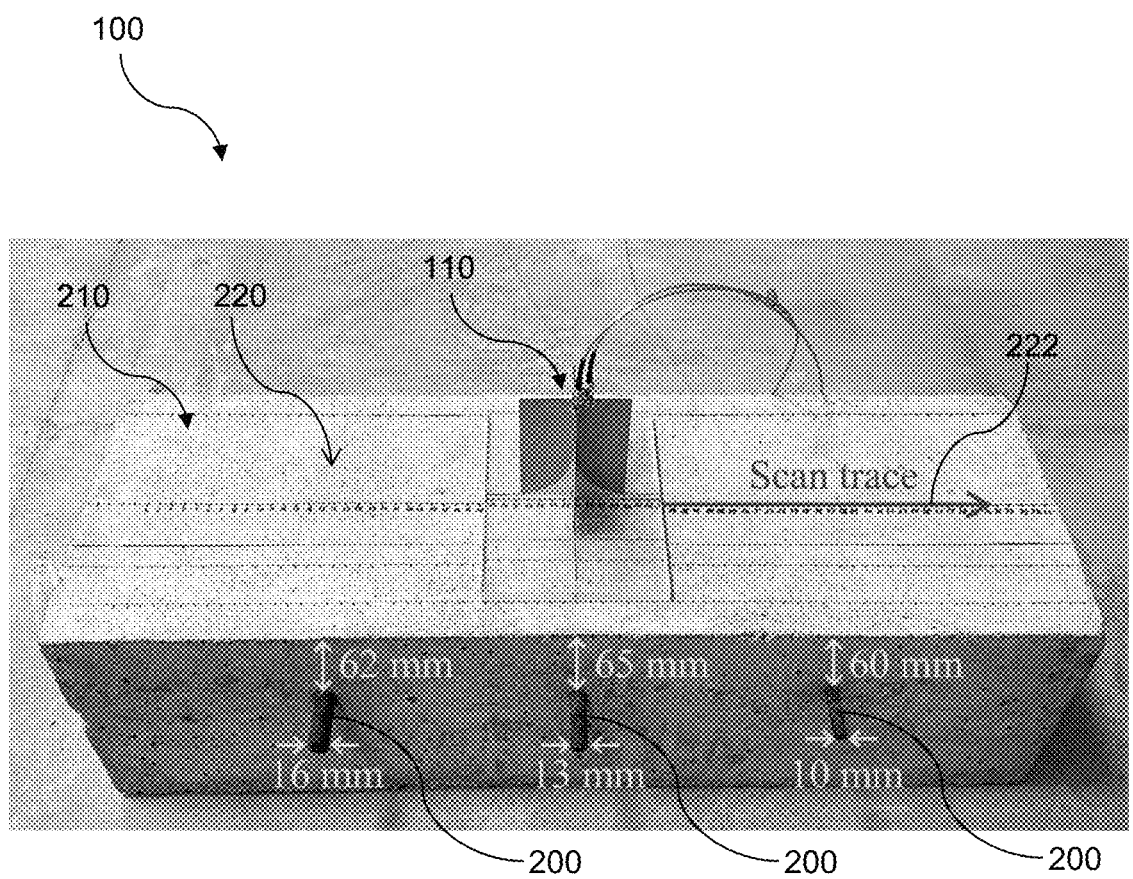
FIGS. 11A to 11C are illustrations of a physical experiment for measuring rebars embedded in concrete.

Another physical experiment was conducted using a concrete structure 210 instead of air or sand medium. FIG. 11A shows the apparatus 100 that was used to conduct the experiment. Three rebars 200 of diameters 16 mm, 13 mm, and 10 mm were embedded in the concrete structure 210 at cover depths of 62 mm, 65 mm, and 60 mm, respectively. The horizontal spacing between the rebars 200 were 20 cm. Dual-polarized Vivaldi antennas 110 were used and the antennas 110 were placed on the surface 220 of the concrete structure 210 and moved along the scanning trace 222. The relatively permittivity value of the concrete structure 210 was predetermined to be 8.0.

Figure 11B:
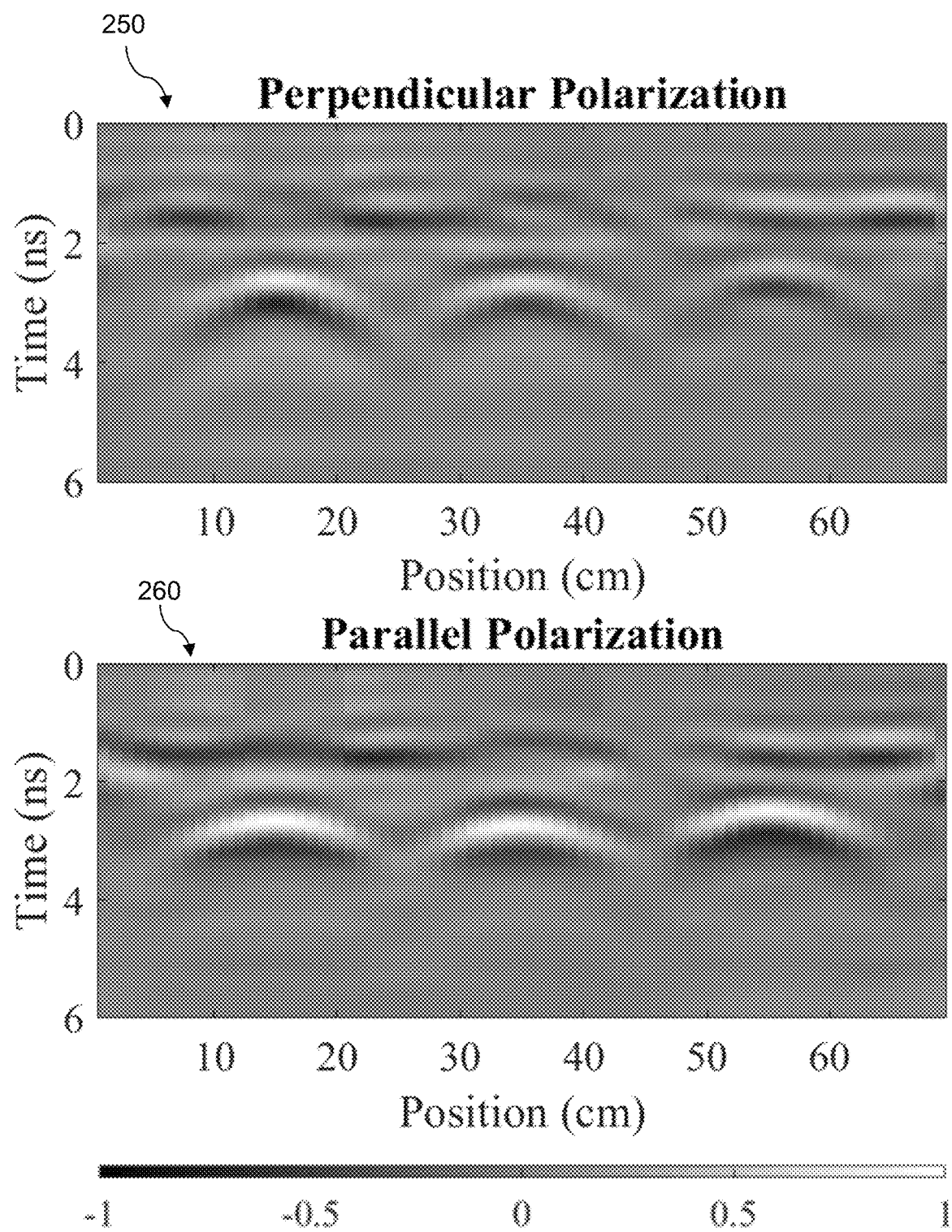
Figure 11C:
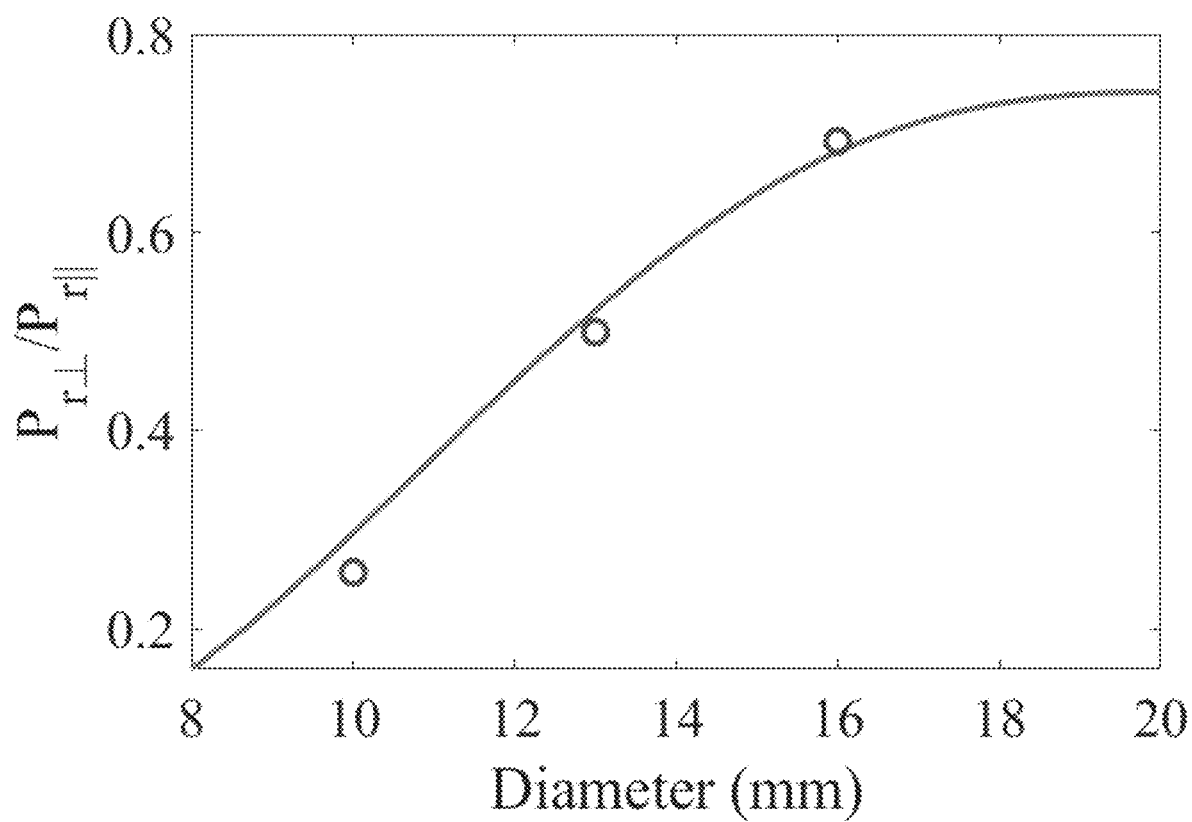

The rebars 200 were measured using radio signals in the frequency domain 0.5 GHz to 2.5 GHz. The representations 250,260 of the rebars 200 were generated based on the measured radio signals and are shown in FIG. 11B. The relationship between the measured power ratios and the different rebar diameters is shown in FIG. 11C. The power ratios were calculated and the diameters of the rebars 200 were estimated as 16.32 mm, 12.68 mm, and 9.47 mm, respectively. The estimated diameters were very close to the actual diameters with a maximum percentage error of 5.3%. The results demonstrate the effectiveness of using this method to measure rebars 200 of different diameters embedded in concrete.

The apparatus 100 and method described in various embodiments herein make use of uses a wideband GPR from perpendicular and parallel polarized antennas 110 to measure the size of embedded objects such as rebars 200 embedded in concrete structures 210. As mentioned above, GPR uses a broadband frequency range for high detection resolution and accuracy. The measurement method take into account both the wideband GPR spectrum and scattering width of the rebars 200 to calculate the power ratios and reliably measure the rebars 200.

The effectiveness of the measurement method was verified in various numerical simulations and physical experiments. The results show that the method can accurately estimate the rebar diameters with percentage errors of less than 10%. The method outperforms conventional GPR measurement methods which tend to produce large errors, especially for small-diameter rebars 200. The method provides high-precision measurement of rebars 200 of various diameters, even for rebars 200 with small diameters such as below 10 mm.

Further, the accuracy of the method is insensitive to the rebar cover depth and subsurface conductivity of the structure 210. With its high accuracy and fast computation time, the method is particularly suitable for in-situ characterization of rebars 200 in concrete buildings. The measured diameters of the rebars 200 can be used to assess the deterioration of the rebar size, such as the mass loss caused by corrosion. Particularly, the measured rebar diameters can quickly assess the rebar damage so that timely repairs can be conducted to mitigate safety hazards. The apparatus 100 and measurement methods thus facilitate non-destructive testing and health inspection of constructions such as reinforced concrete structures and buildings.

Although various embodiments herein describe measurement of rebars 200, particularly cylindrical ones, it will be appreciated that the apparatus 100 and measurement methods may be used to measure rebars 200 of other shapes. It will also be appreciated that the apparatus 100 and measurement methods may be suitable for measuring other embedded or subsurface objects 200 in various applications.

In the foregoing detailed description, embodiments of the present disclosure in relation to an apparatus and method for measuring an embedded object are described with reference to the provided figures. The description of the various embodiments herein is not intended to call out or be limited only to specific or particular representations of the present disclosure, but merely to illustrate non-limiting examples of the present disclosure. The present disclosure serves to address at least one of the mentioned problems and issues associated with the prior art. Although only some embodiments of the present disclosure are disclosed herein, it will be apparent to a person having ordinary skill in the art in view of this disclosure that a variety of changes and/or modifications can be made to the disclosed embodiments without departing from the scope of the present disclosure. Therefore, the scope of the disclosure as well as the scope of the following claims is not limited to embodiments described herein.

The invention claimed is:

1. An apparatus for measuring an object embedded in a structure, the apparatus comprising: a first antenna for use with the structure, such that when the first antenna is arranged on a surface of the structure, a polarization of the first antenna is perpendicular to an orientation axis of the embedded object; a second antenna coupled perpendicularly to the first antenna, the second antenna for use with the structure, such that when the second antenna is arranged on a surface of the structure, a polarization of the second antenna is parallel to the orientation axis of the embedded object; a measurement instrument configured for: transmitting radio signals from the antennas into the structure as the antennas move across the surface of the structure and pass over the embedded object; and measuring, from each antenna, the radio signals transmitted from the antennas and reflected from the embedded object; and a control system configured for: controlling the measurement instrument to configure the antennas to transmit and receive the radio signals for said measurement; generating a first representation of the embedded object based on the measured radio signals from the first antenna; generating a second representation of the embedded object based on the measured radio signals from the second antenna; calculating respective maximum amplitudes of the first and second representations in a time domain; calculating a power ratio of the measured radio signals based on the respective maximum amplitudes of the first and second representations in the time domain, the power ratio defined as a square of a ratio between the maximum amplitude of the first representation and the maximum amplitude of the second representation; and measuring a size of the embedded object based on the power ratio.

2. The apparatus according to claim 1, wherein the control system is further configured for denoising the first and second representations.

3. The apparatus according to claim 1, wherein the representations of the embedded object are radargram images.

4. The apparatus according to claim 1, wherein the radio signals are radio pulse signals having a frequency range of about 0.5 GHz to 3.3 GHz.

5. The apparatus according to claim 1, wherein the embedded object is a reinforcing bar and the structure is a concrete structure.

6. A method for measuring an object embedded in a structure, the method comprising: arranging a first antenna on a surface of the structure, such that a polarization of the first antenna is perpendicular to an orientation axis of the embedded object; arranging a second antenna on the surface of the structure, such that a polarization of the second antenna is parallel to the orientation axis of the embedded object, the second antenna being coupled perpendicularly to the first antenna; configuring the antennas to transmit and receive radio signals for measurement; moving the antennas across the surface of the structure; transmitting radio signals from the antennas into the structure as the antennas move across the structure and pass over the embedded object; measuring, from each antenna, the radio signals transmitted from the antennas and reflected from the embedded object; generating a first representation of the embedded object based on the measured radio signals from the first antenna; generating a second representation of the embedded object based on the measured radio signals from the second antenna; calculating respective maximum amplitudes of the first and second representations in a time domain; calculating a power ratio of the measured radio signals based on the respective maximum amplitudes of the first and second representations in the time domain, the power ratio defined as a square of a ratio between the maximum amplitude of the first representation and the maximum amplitude of the second representation; and measuring a size of the embedded object based on the power ratio.

7. The method according to claim 6, further comprising denoising the first and second representations.

8. The method according to claim 6, wherein the representations of the embedded object are radargram images.

9. The method according to claim 6, wherein the radio signals are radio pulse signals having a frequency range of about 0.5 GHz to 3.3 GHZ.

10. The method according to claim 6, wherein the embedded object is a reinforcing bar and the structure is a concrete structure.

11. A method for measuring an object embedded in a structure, the method comprising: configuring an antenna to transmit and receive radio signals for measurement; arranging the antenna in a first orientation on a surface of the structure, such that a polarization of the antenna is one of perpendicular and parallel to an orientation axis of the embedded object; moving the antenna in the first orientation across the surface of the structure; transmitting radio signals from the antenna in the first orientation into the structure as the antenna moves across the structure and passes over the embedded object; measuring, from the antenna in the first orientation, the radio signals transmitted from the antenna and reflected from the embedded object; generating a first representation of the embedded object based on the measured radio signals from the antenna in the first orientation; arranging the antenna in a second orientation on the surface of the structure, such that the polarization of the antenna is the other of perpendicular and parallel to the orientation axis of the embedded object; moving the antenna in the second orientation across the surface of the structure; transmitting radio signals from the antenna in the second orientation into the structure as the antenna moves across the structure and passes over the embedded object; measuring, from the antenna in the second orientation, the radio signals transmitted from the antenna and reflected from the embedded object; generating a second representation of the embedded object based on the measured radio signals from the antenna in the second orientation; calculating respective maximum amplitudes of the first and second representations in a time domain; calculating a power ratio of the measured radio signals based on the respective maximum amplitudes of the first and second representations in the time domain, the power ratio defined as a square of a ratio between the maximum amplitude of the first representation and the maximum amplitude of the second representation; and measuring a size of the embedded object based on the power ratio.

12. The method according to claim 11, further comprising denoising the first and second representations.

13. The method according to claim 11, wherein the representations of the embedded object are radargram images.

14. The method according to claim 11, wherein the radio signals are radio pulse signals having a frequency range of about 0.5 GHz to 3.3 GHZ.

15. The method according to claim 11, wherein the embedded object is a reinforcing bar and the structure is a concrete structure.

* * * * *